US012670815B1

(12) United States Patent
Kraft et al.

(10) Patent No.: US 12,670,815 B1
(45) Date of Patent: Jun. 30, 2026

(54) POLYESTER BACKED COMBINATION WRISTBAND AND LABEL FORM

(71) Applicant: Rekon, LLC, Pittsburg, KS (US)

(72) Inventors: Roger Kraft, Fort Scott, KS (US); Gina Staudinger, Louisburg, KS (US); Luke Bukowski, Pittsburg, KS (US)

(73) Assignee: Rekon, LLC, Pittsburg, KS (US)

( * ) Notice: Subject to any disclaimer, the term of this patent is extended or adjusted under 35 U.S.C. 154(b) by 153 days.

(21) Appl. No.: 18/614,276

(22) Filed: Mar. 22, 2024

Related U.S. Application Data

(63) Continuation-in-part of application No. 18/152,662, filed on Jan. 10, 2023.

(60) Provisional application No. 63/491,567, filed on Mar. 22, 2023, provisional application No. 63/377,765, filed on Sep. 30, 2022, provisional application No. 63/368,006, filed on Jul. 8, 2022.

(51) Int. Cl.
*G09F 3/02* (2006.01)
*G09F 3/00* (2006.01)

(52) U.S. Cl.
CPC ................ *G09F 3/02* (2013.01); *G09F 3/005* (2013.01); *G09F 2003/0222* (2013.01); *G09F 2003/0225* (2013.01); *G09F 2003/0251* (2013.01)

(58) Field of Classification Search
CPC .... G09F 3/02; G09F 3/005; G09F 2003/0222; G09F 2003/0225; G09F 2003/0251
USPC ....... 40/299.01, 633; 283/67, 70, 72, 74, 75, 283/81, 94, 98, 101, 900
See application file for complete search history.

(56) References Cited

U.S. PATENT DOCUMENTS 6,228,486 B1 5/2001 Kittel et al.
2003/0177681 A1* 9/2003 Riley .................... G09F 3/005 40/633
2005/0259213 A1 11/2005 Rankin, Jr. et al.
2009/0252937 A1 10/2009 Zeik et al.
2009/0277061 A1* 11/2009 Jain ...................... G06Q 99/00 40/633
2011/0244162 A1 10/2011 Honda
2014/0259834 A1 9/2014 Galoff et al.
2017/0282430 A1 10/2017 Baldwin et al.
2022/0157200 A1* 5/2022 Staudinger ............ G09F 3/0288
2023/0019981 A1 1/2023 Ambartsoumian
2024/0185743 A1 6/2024 Ambartsoumian et al.

* cited by examiner

*Primary Examiner* — Justin V Lewis
(74) *Attorney, Agent, or Firm* — AVEK IP, LLC

(57) ABSTRACT

A system may include a front side comprising a paper ply, said paper ply having a label section and a wristband section separated by a line of weakness. Said label section comprises a plurality of printable labels die cut therein. Said wristband section comprises a first wristband portion die cut therein. A system may include a back side comprising a first polyester ply and a second polyester ply spaced apart by a gap. Said first polyester ply opposes at least part of said wristband section. Said second polyester ply is configured as a liner and opposes at least part of said label section. A first layer of adhesive and a first layer of release material are arranged between said paper ply and said first polyester ply, and a second layer of adhesive and a second layer of release material are arranged between said paper ply and said second polyester ply.

20 Claims, 26 Drawing Sheets

POLYESTER BACKED COMBINATION WRISTBAND AND LABEL FORM

RELATED APPLICATIONS

This application claims priority to U.S. Provisional Application No. 63/491,567, filed Mar. 22, 2023. This application is also a continuation-in-part of U.S. application Ser. No. 18/152,662, filed Jan. 10, 2023, which itself claims priority to U.S. Provisional Application No. 63/377,765, filed Sep. 30, 2022, and U.S. Provisional Application No. 63/368,006, filed on Jul. 8, 2022. The disclosure of each of these applications is incorporated by reference in their entirety.

FIELD OF THE DISCLOSURE

The disclosure relates generally to the field of combination wristband and label forms. Specifically, the disclosure relates to a combination form having a polyester backing.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In some aspects, the techniques described herein relate to a combination wristband and label form. The form includes a front side including a paper ply. The paper ply has a label section and a wristband section separated from the label section by a line of weakness. The label section includes a plurality of printable labels die cut therein. The wristband section includes a first wristband portion die cut therein. The form includes a back side including a first polyester ply and a second polyester ply spaced apart from the first polyester ply by a gap. The first polyester ply opposes at least part of the wristband section. The second polyester ply is configured as a liner and opposes at least part of the label section. A first layer of adhesive and a first layer of release material are arranged between the paper ply and the first polyester ply. A second layer of adhesive and a second layer of release material are arranged between the paper ply and the second polyester ply.

In some aspects, the techniques described herein relate to a combination wristband and label form, wherein an average thickness of the first polyester ply is disparate from an average thickness of the second polyester ply.

In some aspects, the techniques described herein relate to a combination wristband and label form, further including a static-resistant coating associated with at least one of the first polyester ply and the second polyester ply.

In some aspects, the techniques described herein relate to a combination wristband and label form, wherein the line of weakness extends within the gap.

In some aspects, the techniques described herein relate to a combination wristband and label form, wherein the gap is devoid of polyester.

In some aspects, the techniques described herein relate to a combination wristband and label form, wherein the second polyester ply has a variable thickness.

In some aspects, the techniques described herein relate to a combination wristband and label form, wherein the second polyester ply has an average thickness of less than 2 mil.

In some aspects, the techniques described herein relate to a combination wristband and label form, wherein each of the first polyester ply and the second polyester ply have a variable thickness.

In some aspects, the techniques described herein relate to a combination wristband and label form, wherein each of the first polyester ply and the second polyester ply have an average thickness of less than 2 mil.

In some aspects, the techniques described herein relate to a method of forming a combination wristband and label form, the method including dividing a paper ply into a label section and a wristband section with a line of weakness. The label section includes a plurality of printable labels die cut therein. The wristband section includes a first wristband portion die cut therein. The method includes providing a first polyester ply and a second polyester ply. The method includes skiving, using a roller, at least one of the first polyester ply and the second polyester ply to cause the at least one of the first polyester ply and the second polyester ply to have a variable thickness. The method includes disposing a first layer of adhesive and a first layer of release material between the paper ply and the first polyester ply. The method includes disposing a second layer of adhesive and a second layer of release material between the paper ply and the second polyester ply.

In some aspects, the techniques described herein relate to a method, wherein the skiving reduces a thickness of the at least one of the first polyester ply and the second polyester ply.

In some aspects, the techniques described herein relate to a method, further including providing a gap in the combination wristband and label form between the first polyester ply and the second polyester ply, the gap being devoid of polyester.

In some aspects, the techniques described herein relate to a method, wherein an average thickness of at least one of the first polyester ply and the second polyester ply is less than 2 mils.

In some aspects, the techniques described herein relate to a method, wherein an average thickness of each of the first polyester ply and the second polyester ply is less than 2 mils.

In some aspects, the techniques described herein relate to a method, wherein the average thickness of each of the first polyester ply and the second polyester ply is one of about 0.48 mils, about 0.92 mils, about 1.2 mils, and about 1.42 mils.

In some aspects, the techniques described herein relate to a method, further including associating a static-resistant coating with at least one of the first polyester ply and the second polyester ply.

In some aspects, the techniques described herein relate to a method of forming a combination wristband and label form, the method including dividing a paper ply into a label section and a wristband section with a line of weakness. The label section includes a plurality of printable labels die cut therein. The wristband section includes a first wristband portion die cut therein. The method includes providing a polyester ply. The method includes skiving the polyester ply using a roller to cause the polyester ply to have a variable thickness, and disposing a layer of adhesive and a layer of release material between the polyester ply and each of the label section and the wristband section of the paper ply.

In some aspects, the techniques described herein relate to a method, further including associating a static-resistant coating with the polyester ply.

In some aspects, the techniques described herein relate to a method, wherein the polyester ply has an average thickness less than or equal to 2 mils.

In some aspects, the techniques described herein relate to a method, wherein the polyester ply has an average thickness of no more than about 1 mil.

BRIEF DESCRIPTION OF THE SEVERAL VIEWS OF THE DRAWINGS

Illustrative embodiments of the invention are described in detail below with reference to the attached drawing figures.

DETAILED DESCRIPTION

Figure 1:
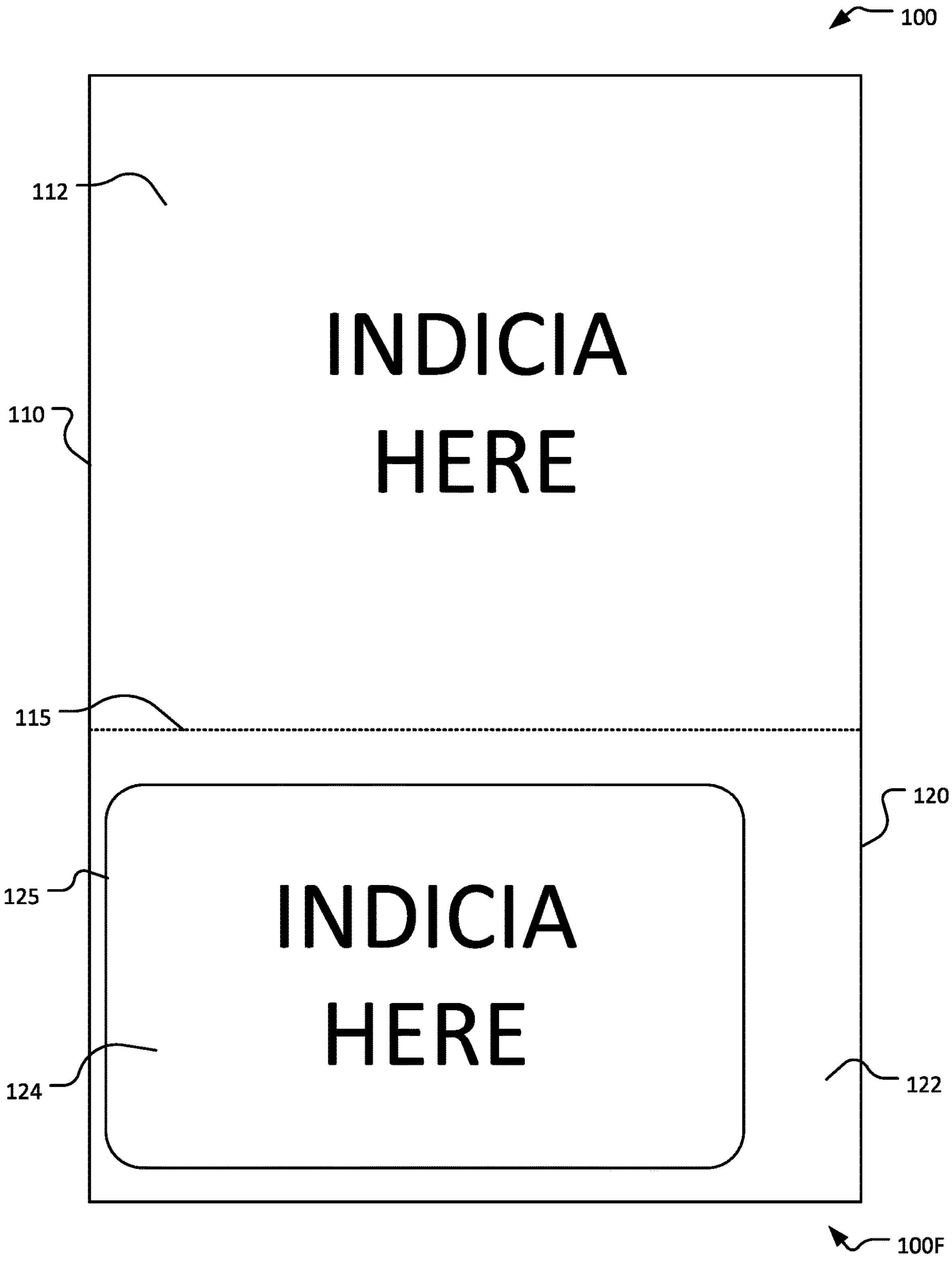
FIG. 1 shows a front view of a business form employing a polyester liner, according to an embodiment of the disclosure.

The subject matter of select exemplary embodiments is described with specificity herein to meet statutory requirements. But the description itself is not intended to necessarily limit the scope of any claims hereinafter written. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

Business forms comprising one or more labels and/or wristbands die cut (or otherwise formed) therein are known in the art. Business forms are a frequently used instrument for providing documents having removable, wearable wristbands as well as removable labels. The removable labels are typically configured to be re-adhered to another surface or substrate. Prior art business forms often have disadvantages. For example, prior art business forms typically have a relatively thick paper or polyester layer carrying silicone. The paper layers are not water resistant, causing the business form to become damaged when exposed to fluids. Polyester layers of such thickness (e.g., 2 mil) undesirably add size and/or increase manufacturing costs to the conventional business forms. Rolling or otherwise storing the forms with this thicker layer is more difficult to accomplish relative to thinner business forms. Furthermore, polyester release liners typically are manufactured with a set tackiness or stickiness that is difficult to modify. If the releasability of the conventional polyester liners was not suited for a particular business form application, the user was out of luck.

Conventional business forms typically use thicker (e.g., greater than 1.8 mil thick) release liners due to the advantages such thicker liners provide. For example, thicker liners provide a great deal of strength and/or resistance to deformation. Without this resistance to deformation, the conventional business forms are more likely to curl or otherwise lose their shape, which often causes issues such as jamming during printing. These thicker liners are also more resilient to changes in moisture or humidity. Without this added resistance to moisture levels, the prior art business forms would have to undergo extensive, costly, and arduous environmental controlling processes to limit the damage moisture would cause to the form. Besides added resistance to moisture, the thicker liners may also provide resistance to static charge build up that may occur, especially during printing of the conventional business forms. Static charge collected by the business forms may cause portions of the conventional business form to unduly stick to the printer during printing. In fact, it is not recommended to pass conventional forms below a certain thickness through a printer, as the static build up that would result is likely to cause problems. With the thicker liner, these issues of static charge build up may be largely ignored.

Besides losing out on the advantages conferred by a thicker liner, thinner liners are associated with their own set of difficulties. The thinner liner provides less strength, moisture resistance, and static charge resistance to the business form, which makes it exponentially more difficult to control these variables and provide for a business form that is less susceptible to these conditions. For example, a user may wish to apply heat to a business form having a thinner liner to adjust the moisture level thereof. However, this heat applies significantly more stress on the underlying paper ply of the business form since the form does not have the thicker liner. Therefore, the task of properly heating the business form to achieve the desired moisture level becomes an extremely difficult, if not impossible task. Embodiments of a business form with polyester backing disclosed herein may address these issues discussed above at least in part.

Figure 2:
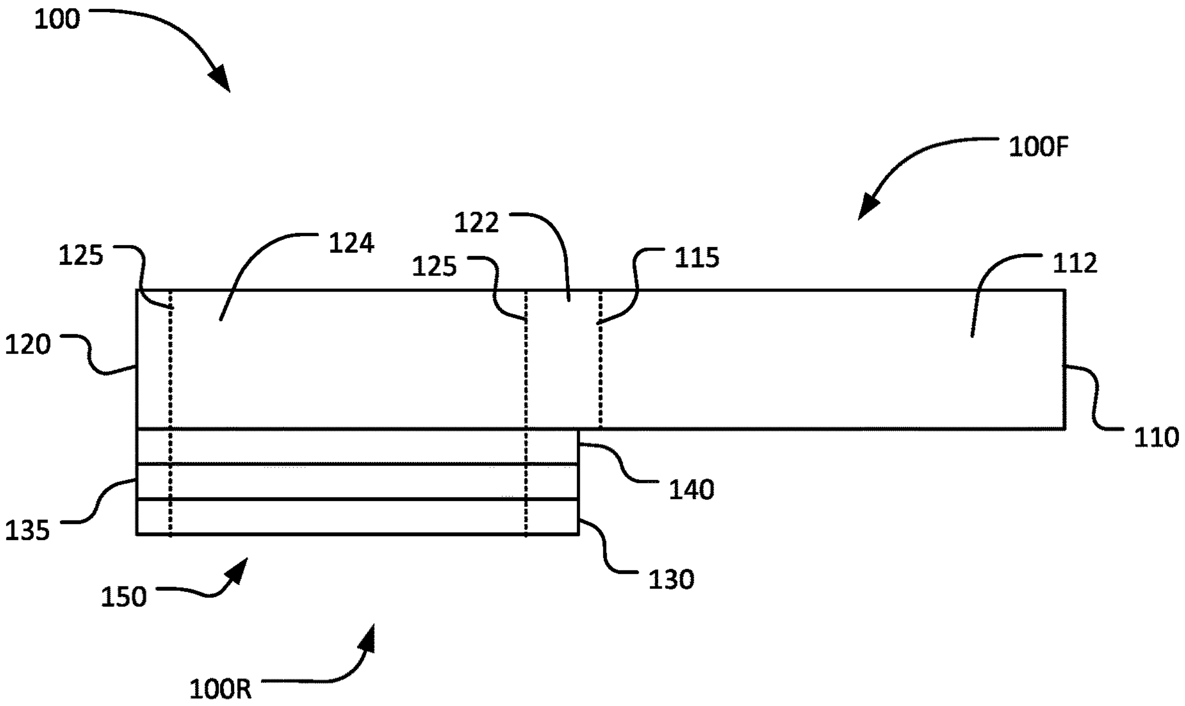
FIG. 2 shows a schematic view of the business form employing the polyester liner of FIG. 1.
Figure 3:
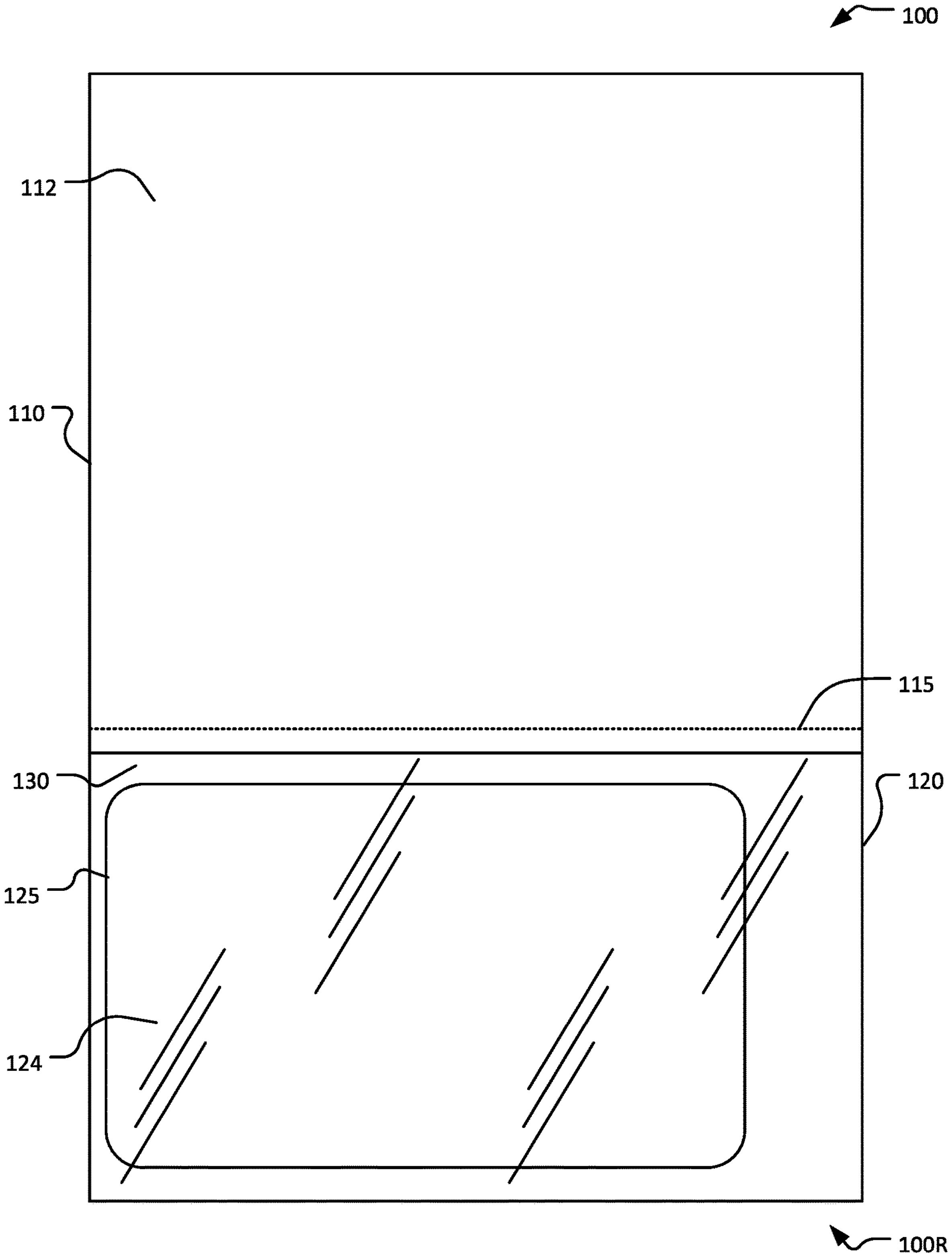
FIG. 3 shows a rear view of the business form employing the polyester liner of FIG. 1.

Focusing now on FIGS. 1-3, an embodiment 100 of a business form having a polyester liner 130 (FIG. 3) is shown. The business form 100 may comprise two or more sections, such as an information section 110 and a label section 120 separated by a line of weakness 115 (e.g., die cuts, perforations, et cetera). That is to say, the lines of weakness 115 may define the portions 110 and 120. The business form 100 may further comprise both a front side 100F and a rear side 100B (FIG. 3), as well as one or more paper plies 112 and 122, the polyester liner 130, silicone release layers 135, and adhesive layers 140. Information or other indicia (e.g., images, text, colors, barcodes, etc.) relevant to a business form application may be printed (e.g., via direct thermal printing, thermal transfer, inkjet, or other suitable printing methods) within the information section 110. Labels 124 found within the label region 120 may be removable from the business form 100, and once removed, may be adherable to another surface or substrate (e.g., a package). The business form 100 may be relatively thinner than conventional business forms through the use of a relatively thin polyester release liner, which may be manufactured using the roller 200 (FIG. 4), as will be discussed in further detail below.

The business form 100 may comprise printed indicia. The printed indicia may be preprinted (e.g., by the manufacturer) and may comprise instructions for using the business form 100 or other static or variable indicia. Alternately or additionally, in embodiments, the business form 100 may comprise printed matter which is selectively applied thereto by a user, such as shipping information, package list information, invoice information, et cetera. The business form 100 may use any suitable form of printing now known or subsequently developed.

The information section 110 and the label section 120 may be formed from a single paper ply. That is to say, the information section paper ply 112 may be coplanar or coexistent with the label section paper ply 122. The paper ply 112 and/or the paper ply 122 may be configured to receive printed matter, such as through the use of printable coatings or by being inherently printable, for example. While FIG. 1 displays printed matter on the front side of the plies 112, 122, embodiments of the business form 100 may have alternately or additionally have printed matter on the back side 100R of the form 100. Furthermore, one or more polyester plies may be substituted for the paper plies 112 and 122 where desired, as described herein.

The one or more labels 124 may be defined by lines of weakness 125 (e.g., perforations, die cuts, etc.) in the paper ply 122. The lines of weakness 125 may be broken or otherwise exploited to remove the labels 124 (and the other layers 130, 135, and 140 associated therewith) (FIG. 2) from the business form 100. The labels 124 may be releasably secured to the liner ply 130 by an adhesive layer 140. The one or more labels 124 may be configured to receive printed matter (e.g., at the same or a different time than when the information section 110 receives printed matter).

Focusing now on FIG. 2, a schematic side view is shown of the business form 100. The artisan would understand that the layers shown are not to scale, and are instead sized to provide clarity as to the makeup of the business form 100. While layers are located exclusively on the face ply 122 in FIG. 2, in embodiments, this may not be the case.

Starting from the front side 100F and moving towards the rear side 100R of the business form 100, the paper plies 112 and 122 are first encountered. As mentioned above, the paper plies 112 and 122 may be part of the same, singular paper ply, or they may be a plurality of paper plies (e.g., stacked in an overlapping manner, side-by-side, et cetera). The adhesive layer 140 applied to the rear face 100R of the label section 120 adjacent the one or more labels 124 may next be encountered. The adhesive used in the layer 140 may be any suitable adhesive now known or subsequently developed. In embodiments, the adhesive layer 140 may be specifically chosen to be compatible with the type of printing that will be used on the business form 100, such as laser printing. The adhesive layer 140 may be configured such that a portion of the layer 140 comes away with the one or more labels 124 when those labels 124 are removed from the rest of the label section 120. The adhesive layer 140 may reside (e.g., entirely) within the label region 120. In embodiments, the adhesive layer 140 covers the majority of the label region 120. In still more embodiments, the adhesive layer 140 may be selectively applied such that the only the labels 124, and optionally a small border around the labels 124, are covered in the adhesive layer 140. In embodiments, the adhesive layer 140 may be optimally arranged on the business form 100.

A polyester layer 130 and a silicone layer 135 may collectively form a release liner 150 of the business form 100. The silicone layer 135 may have releasable properties such that the silicone layer 135 may be readily peelable or otherwise removable from an adhesive. Meanwhile, the polyester layer 130 may provide structural strength to the silicone layer 135, and the paper ply 122 while attached thereto. These two layers 130 and 135 may cover (e.g., entirely cover) the adhesive layer 140 such that the adhesive layer 140 does not unduly adhere to debris or an unwanted surface. The release liner 150 may be formed using a roller machine 200 (FIG. 4), as will be discussed in further detail below. The artisan would understand that, in some embodiments, the lines of weakness 125 may extend through one or more of these layers 130, 135, and 140 to facilitate the removal of the labels 124 and the portions of the layers 130, 135, and 140 associated therewith.

The release liner 150 may be relatively thinner (e.g., by having a thickness in the range of 0.4 mil to 1.8 mil) than prior art release liners, which are more than 1.8 mil thick. In embodiments, the release liner 150 may be about 0.4 mil, 0.5 mil, 0.6 mil, 0.7 mil, 0.8 mil, 0.9 mil, or 1.0 mil thick. In other embodiments, the release liner 150 may be about 1.1 mil, 1.2 mil, 1.3 mil, 1.4 mil, 1.5 mil, 1.6 mil, 1.7 mil, or 1.8 mil thick. In currently preferred embodiments, the release liner 150 (i.e., the polyester layer 130 and the silicone layer 135) has a thickness of one of 0.48 mil, 0.92 mil, and 1.42 mil. In the prior art, for label applications such as the applications disclosed herein, a polyester/silicone liner typically has a thickness of 2 mil or more.

This release liner 150 (e.g., a release liner having a polyester liner and a silicone layer and having an average thickness of 0.48 mil, 0.92 mil, or 1.42 mil, for example) may be configured for use with shipping labels by a skiving process. The skiving apparatus may comprise a roller machine 200 (FIG. 4), which uses a roller 210 to skive, knurl, or otherwise scrap a selective amount of silicone layer 135 off of the polyester layer 130. The roller 210 may be, for example, a slotted roller, a modified roller, et cetera. The remaining silicone layer 135 may form a pattern (e.g., have peaks and valleys). Selectively removing some of the silicone layer 135 and/or creating a pattern therein may modify the release properties of the release liner 150 beyond that of merely applying less silicone to a liner layer. For example, the silicone layer 135 may still releasably couple the adhesive layer 140 to the polyester layer 130, but the strength of that coupling (or the "tightness," as people in the industry may call it) may change. In embodiments, the use of the slotted roller 210 may increase the grip of the adhesive layer 140 on the release liner 150, requiring more force to separate the layers 140 and 135. Put in other words, not only may this process desirably decrease the thickness of the release liner 150, but it may also desirably increase how tightly the adhesive layer 140 affixes to the release liner 150. A stock polyester layer 130 having silicone 135 and an average thickness of under 1.8 mil may not operate as intended in shipping labels.

In embodiments, the roller machine 200 may alternatively or additionally perform skiving on any other layer of the label 100 besides the release liner 150. For instance, skiving may be performed on the polyester layer 130, the paper ply 112, the paper ply 122, et cetera. Such embodiments of the label 100 may have one or more layers which are relatively thinner than a corresponding layer of a conventional label due to this skiving operation. In still more embodiments, the label 100 may be relatively thinner (e.g., by having a label 100 layer that is relatively thinner than a corresponding conventional layer) without the use of the roller machine 200 skiving operation. This thinness may be achieved, for example, by manufacturing a release liner 150, or other layer, with peaks and valleys or another similar pattern. This may differ from the previously described skiving operation, where a pre-manufactured release liner (or other layer) may be modified by reducing a thickness thereof via the skiving operation.

The business form 100 may have one or more other coatings or layers applied thereto. For example, the business form 100 may have, in embodiments, a coating which provides resistance to static charge build up in the form 100. One such example coating may be Staticide, produced by ACL Inc., of Chicago, Illinois. As another example, the business form 100 may alternately or additionally have a coating which increases the water resistance of the business form 100. In embodiments, the business form 100 may alternately or additionally use other anti-static methods, such as an anti-static rope or bar.

Figure 5:
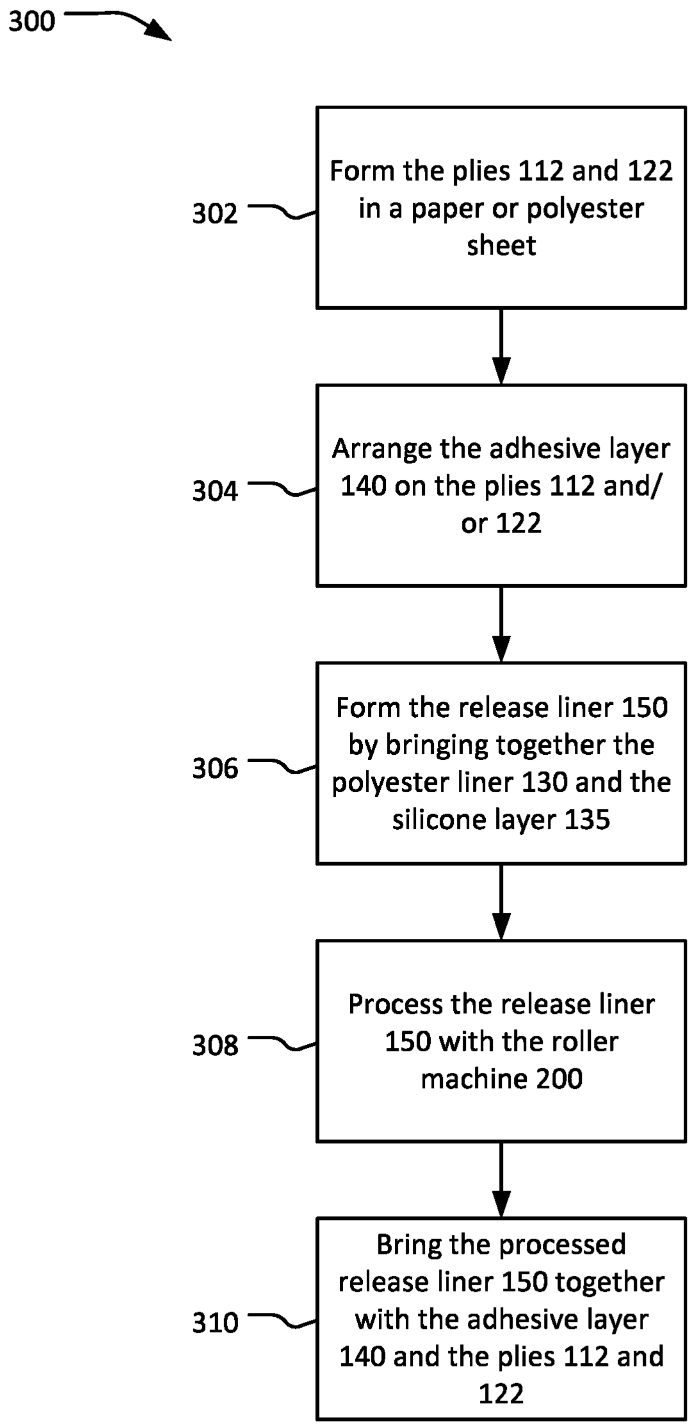
FIG. 5 is a flow chart illustrating a method of using the duplex label employing the single sided intermediate liner of FIG. 1.

FIG. 5 is a flowchart illustrating a method 300 of forming the various embodiments of the business form disclosed herein. First, at step 302, the plies 112 and 122 may be formed in a paper or polyester sheet. Lines of weakness 115 may be formed here to distinguish sections 110 and 120.

Then, at step 304, the adhesive layer 140 may be optimally arranged along the rear face of the plies 112 and/or 122, as described in more detail above (i.e., in the vicinity of the one or more labels 124).

Next, at step 306, the release liner 150 may be formed by locating the silicone layer 135 on the polyester liner 130. Then, at step 308, the release liner 150 may be processed through the roller machine 200. Specifically, the release liner 150 may be skived, pressed, scraped, or knurled by the slotted roller 210 to effectively decrease the thickness of the release liner 150 and impart a pattern thereon. Finally, at step 310, the release liner 150 may be brought in contact with the adhesive layer 140 of the business form 100 to temporarily affix thereto.

The steps of the method 300 may be omitted, added to, or modified to implement the various embodiments of the business form described herein. For example, the step of printing indicia or other printed matter (e.g., with laser printing) may be added to the method 300. As another example, the step of removing one or more of the labels 124 and applying the labels 124 to another surface may be added to the method 300.

By processing the release liner 150 with the roller machine 200, a relatively thinner business form 100 that does not suffer from the same issues as conventional thin business forms may be created. The increased tightness of the release liner 150 may prevent the release liner 150 from prematurely disassociating from the plies 112 and 122, such as when a static build up occurs during travel of the business form 100 through a printer. A business form using a polyester liner may benefit from the fact that polyester is nonporous (i.e., more water resistant than paper) and has better tensile strength than a paper liner.

Furthermore, depending on the application, and the thickness of the liner 150, a user may add or decrease the moisture in the form. Moisture may be added to the business form 100 through steam, a humidifier, et cetera. Moisture may be removed from the business form 100 by applying heat thereto.

The artisan would understand that while a single information section 110 and a single label section 120 are shown in the figures, other arrangements are contemplated herein. Furthermore, any suitable number and arrangement of labels (and their associated adhesive, silicone, and polyester liner layers) are contemplated and within the scope of the disclosure.

The techniques described above (e.g., a polyester liner that has undergone a skiving process) may be used in a variety of applications/configurations. For instance, FIGS. 6-10 depict an embodiment 100' of a label having one or more polyester plies. The disclosure relates generally to a duplex label having a single sided intermediate liner usable in a plethora of applications requiring the attachment of a label to a substrate, such as packages, letters, medications, et cetera. These applications and the use of the duplex label therewith are discussed in-turn. The duplex label with single sided intermediate liner embodiments described herein may have a plurality of face plies that may be separable and may each receive printed matter.

As is known, a shipping label is adhered to a package and identifies the sender and recipient of the package. Conventional shipping labels have a front face for the printing of indicia and a back face that is adhered to the package. Traditionally, the back face is covered with adhesive, and a liner is removably secured to the back face via this adhesive. As is known, during transportation or otherwise before the label is adhered to a substrate (e.g., a package or other similar surface), the liner covers the adhesive. This is to ensure that the label does not undesirably stick to objects (e.g., other labels, print heads, and/or other components of apparatus used to make and/or print the label) other than the substrate to which the label is to be adhered. Prior to use, the liner is removed, either by hand or otherwise, to expose the adhesive, and the label (specifically, the face ply thereof) is adhered to the package being delivered using the exposed adhesive.

A traditional duplex label is a label with a single face ply that can receive indicia (e.g., printed matter, barcodes, images, etc.) on both a front side and a back side. In some cases, conventional duplex labels are constructed of multiple face plies. For example, conventional duplex labels may have a first face ply that may receive a first set of printed indicia, and a second face ply that may receive a second set of indicia. These two face plies are then secured together to form the prior art duplex label. Accessing the second set of indicia (which is normally hidden from view by the first face ply and the surface to which the prior art label is adhered to) when the prior art duplex label is adhered may be problematic, however. To access the hidden indicia, the prior art multi-ply duplex labels must be removable, in some fashion, from the adhered surface. Some prior art duplex labels accomplish this by employing a removable adhesive or are designed to be adhered only to specific surface types which they are capable of being removed from, such as non-porous surfaces. These specific configurations limit the usage and flexibility of the prior art duplex labels.

Another way the prior art duplex labels may reveal hidden indicia is through the use of removable label portions that may be removed along perforations, die cuts, lines of weakness, et cetera. The indicia on the removed portion may then be available for viewing by the user. However, these removable portions are not re-adherable, thus limiting their flexibility. Further, some traditional multi-ply duplex labels utilize multiple liner layers, which disadvantageously increase the cost, waste, and size of the traditional labels.

It may be advantageous to have a multi-ply duplex label that does not suffer from the disadvantages associated with conventional multi-ply duplex labels. The present disclosure provides for such a label that addresses at least some of the problems associated with prior art duplex labels.

Figure 6:
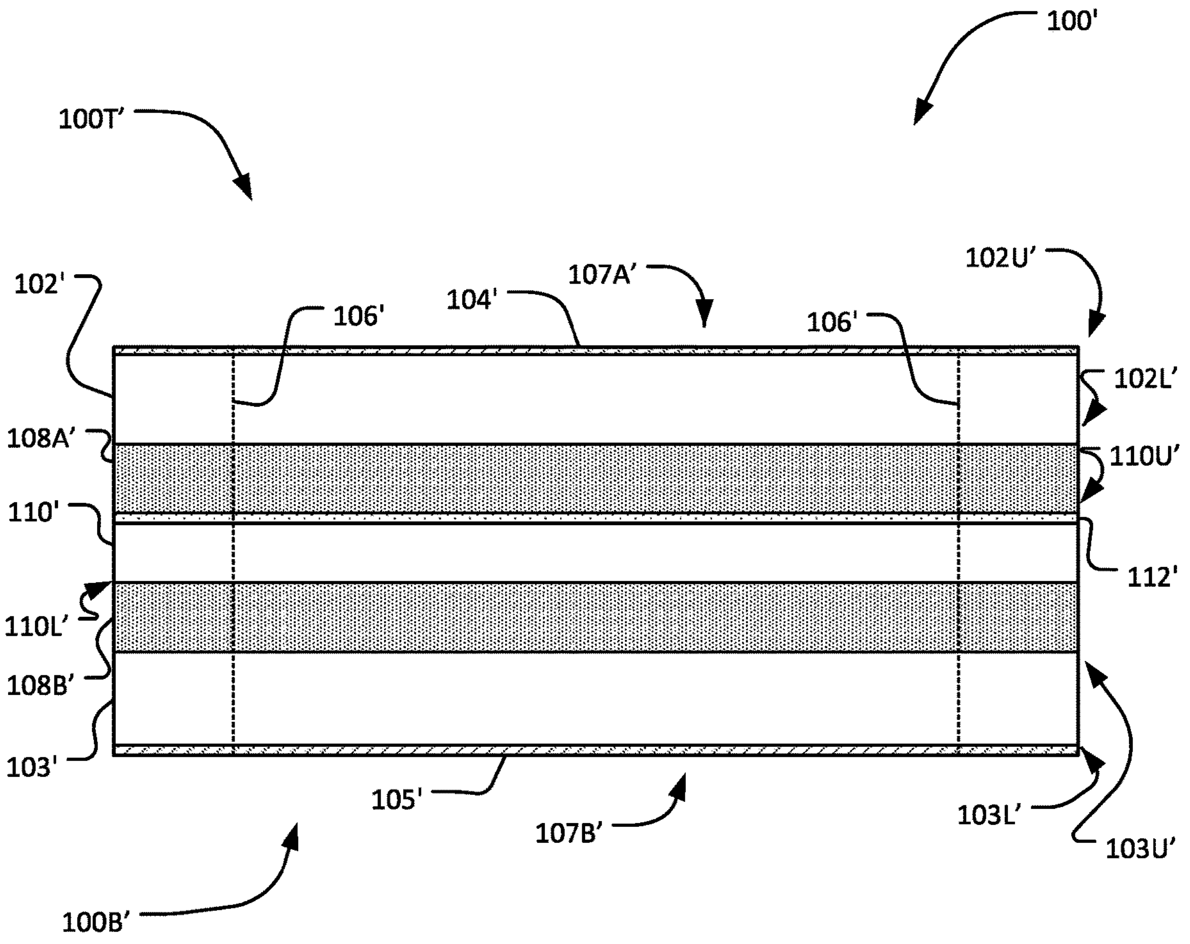
FIG. 6 is a schematic representation of a duplex label employing a single sided intermediate liner, according to an embodiment of the disclosure.

Focus is directed now to FIG. 6, which shows an example embodiment 100' of a duplex (e.g., double sided printed), multi-ply label having a single sided intermediate liner 110', according to the teachings of the present disclosure. The illustrated label 100' has a front or top side 100T' and a back or bottom side 100B'. As discussed herein, indicia may be printed on the top side 100T' and/or the bottom side 100B', and the label 100' may be adhered to a substrate 50 (FIGS. 9A-9E) (e.g., a cardboard box, a piece of paper, an envelope, a porous surface, a non-porous surface, and/or any other suitable surface) at the bottom side 100B'. A portion of the label 100' may be removable from the rest of the label 100' sometime after the label 100' is adhered to the substrate 50. Due to the intermediate liner ply 110', the face plies of the label 100' may be separable from each other. Such a configuration may allow for the reapplication of one of the face plies to the same or another substrate 50. In this way, the indicia that was previously hidden (e.g., by nature of being sandwiched between the topmost face ply and the substrate 50) may be revealed to a user.

An example application of the label 100' may be a label containing shipping information indicia on a top side 100T' and return shipping information indicia on a back side 100B'. The label 100' may be adhered to a substrate 50 (e.g., a package to be shipped) with the shipping information indicia being visible. The receiver of the package may separate one or more portions (e.g., a first central portion 107A' and a second central portion 107B') of the label 100' from the rest of the label 100'. The package receiver may then separate the one of the face plies from the intermediate liner ply 110' and apply the removed portion to the same or another substrate 50. In this way, the previously hidden return shipping indicia may now be displayed.

In more detail, and going from the label top side 100T' to the label back side 100B', the label 100' may have a first face stock 102', which may have an upper side 102U' and a lower side 102L'. The first face stock 102' may comprise a solitary ply 102', made, for example, of paper or a polyester ply, like the clear polyester ply 130 described above. This face stock 102' may also be referred to herein as a face ply to indicate that the face ply comprises a solitary ply. Alternately, in other embodiments, the face stock 102' may contain more than one ply. In other embodiments still, the face stock 102' may comprise a film (e.g., a clear plastic film) or other printable substrate. In essence, the first face ply 102' may be any suitable material that is desired.

The first face ply 102', at its upper side 102U', may be provided with a topcoat 104'. The topcoat 104' may be configured for the reception of printed (e.g., black and/or colored) indicia (e.g., content configured to be consumed by consumers). As such, the label 100' may be printed using any suitable technology now known or subsequently developed (such as a direct thermal printer, a thermal transfer printer, a laser printer, an inkjet printer, et cetera). In embodiments, the topcoat 104' may be foregone where the first face stock 102' is inherently printable. Alternately or additionally, the topcoat 104' may be located only where printing is desirable. For example, in embodiments, the topcoat 104' may be located only in the first central portion 107A' (e.g., an area defined by lines of weakness 106') of the label 100'.

A first adhesive layer 108A' may be located on the face ply lower side 102L'. The adhesive layer 108A' may comprise any suitable (e.g., compatible with the type of printing used) adhesive now known or subsequently developed, such as hot melt adhesive, pressure sensitive adhesive, remoistenable adhesive, et cetera. In embodiments, the first adhesive layer 108A' may adhesively couple the first face ply 102' to the intermediate liner layer 110'.

The intermediate liner layer 110' may be sandwiched between the first adhesive layer 108A' and a second adhesive layer 108B' (which itself may be substantially the same or similar to the first adhesive layer 108A'). The liner layer 110' may be a paper, film, or other ply that has releasable properties on only a single side. That is to say, one of the sides of the intermediate liner layer 110' may have properties which enable adhesive to be temporarily secured thereto, while the other side is devoid of such releasable properties. For example, the intermediate liner layer 110' may have one or more releasable coatings 112' having releasable properties located on the liner ply lower side 110L' and/or the liner ply upper side 110U'. In embodiments, alternately or additionally to the face ply 102', the intermediate liner layer 110' may comprise a clear polyester ply, such as the clear polyester ply 130 discussed above.

In operation, the liner ply 110' may have releasable properties on the sides 110U' or 110L' where it is desired to temporarily secure the first face ply 102' or a second face ply 103', respectively, to the liner ply 110'. In embodiments, the liner layer 110' may have indicia printed (e.g., preprinted, printed prior to label 100' assembly, etc.) thereupon. This preprinted information on the liner layer 110' may be, for example, promotional (e.g., a coupon, an advertisement, etc.) or other indicia that may be available for viewing by a user after the first face ply 102' or the second face ply 103' is removed from the liner layer 110'. In a currently preferred embodiment, the liner layer 110' may have releasable properties only on the upper side 110U', and on the bottom side, the liner layer 110' may be adhesively and fixedly secured to the second face ply 103'. Such fixed securement of the second face ply 103' to the liner layer 110' may increase the structural integrity and durability of the second face ply 103', both for printing and for storage.

Like the first adhesive layer 108A', the second adhesive layer 108B' may be any suitable adhesive now known or subsequently developed. In embodiments, the second adhesive layer 108B' may be a different type of adhesive than the adhesive used in the first adhesive layer 108A'.

The second face ply 103' may be substantially the same or similar to the first face ply 102', except that the second face ply 103' may be secured to the label 100' along the label bottom side 100B'. Specifically, the second face ply 103' may be secured to the second adhesive layer 108B' at a second face ply upper side 103U' and may have a second printable coating 105' on the lower side 103L' thereof. Like the first printable coating 104', the second printable coating 105' may receive printed matter or indicia. In embodiments, the second printable coating 105' is a different kind of coating than the first printable coating 105'. In embodiments where the first face ply 102' is fixedly secure to the liner ply 110', the second face ply 103' may be temporarily secured to the intermediate liner ply 110' such that the second face ply 103' is removable by a user. While the second face ply 103' may not have adhesive on the lower side 103L' thereof, the second face ply 103' may contact and remain in contact with the substrate 50 upon adhesion of the label 100' to the substrate because of the configuration of the label 100'.

In embodiments, one of the face ply 102', the face ply 103', and the intermediate liner layer 110' comprise the clear polyester ply 130. In other embodiments, the face ply 102' and the face ply 103' may each be made of a clear polyester ply 130. In such cases, the intermediate liner layer 110' may be made from a paper ply to, for example, provide structural integrity to the label 100'

In embodiments, the size and/or shape of the second face ply 103', the second adhesive layer 108B', and the liner ply 110' may match that of the other label 100' layers (e.g., the first face ply 102'). In other embodiments, the size and/or shape of one or more label 100' layers may be different from another. For instance, the second liner ply 103', the second adhesive layer 108B', and the liner ply 110' may be sized such that a perimeter of each of these layers bounds a perimeter of the first layer of adhesive 108A' and the first face ply 102'.

The second face ply 103' may have a second central portion 107B' that generally corresponds (e.g., by having a similar shape, by having a similar size, etc.) with the first central portion 107A'. In embodiments, the first central portion 107A' may include portions of the first face ply 102' and the first adhesive layer 108A', and the second central portion 107B' may include portions of the intermediate liner ply 110', the second adhesive layer 108B', and the second face ply 103'. Like the first central portion 107A', the second central portion 107B' may be delineated by the lines of weakness 106' (e.g., the lines of weakness 106' may extend through the label 100' layers and define both the first central portion 107A' and the second central portion 107B'). In some embodiments, the central portions 107A', 107B' are defined by different sets of lines of weakness 106'. In these cases, the central portions 107A', 107B' may be of different sizes.

Figure 6A:
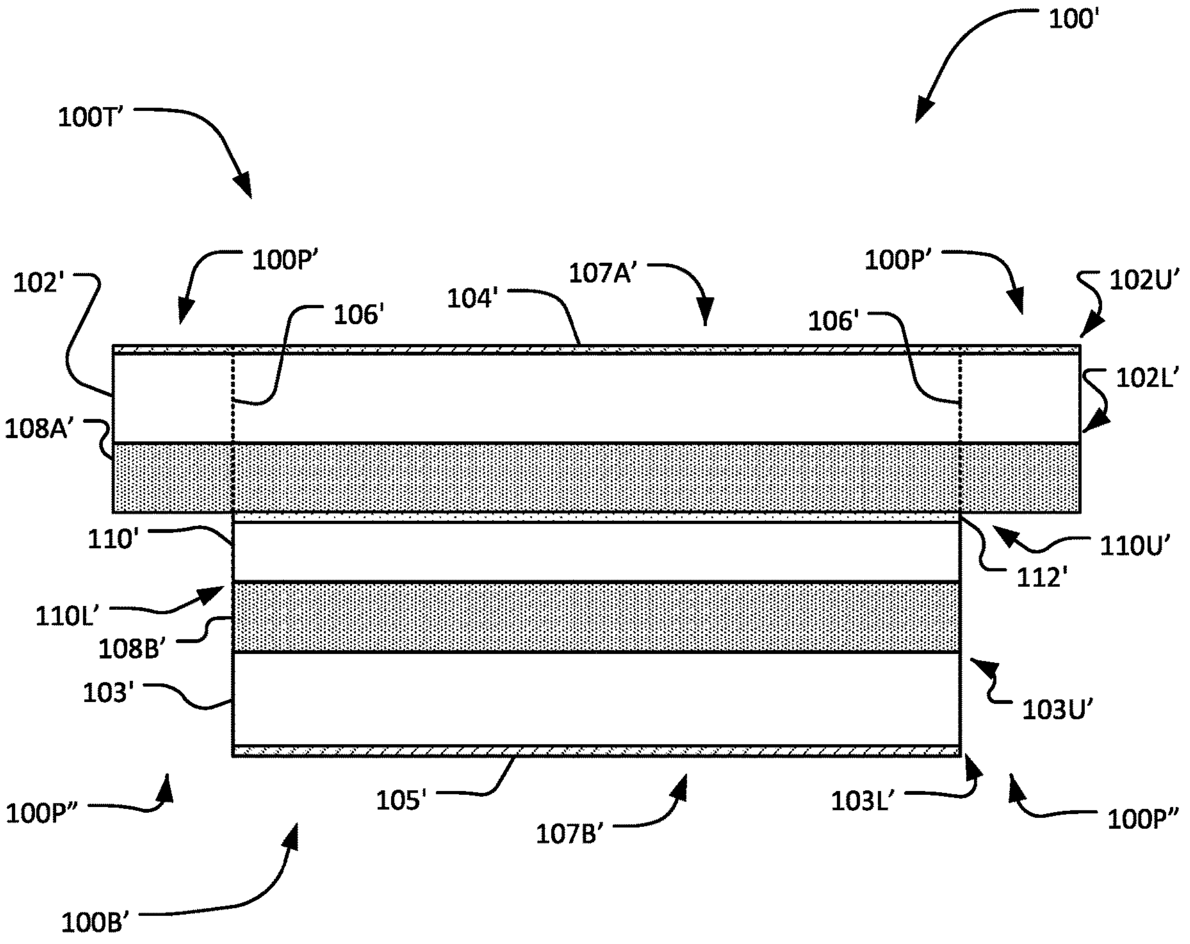
FIG. 6A is a schematic representation of the duplex label employing the single sided intermediate liner of FIG. 6, in a use configuration.

In FIG. 6A, a use configuration is shown where portions of the label 100' is removed and the label 100' has been prepared for securement to the substrate 50. FIG. 6A also highlights an upper perimeter portion 100P' and a lower perimeter portion 100P'' of the label 100' (in FIG. 6A, a void is shown in place of the perimeter portion 100P'' that has been removed to prepare the label 100' for securement to the substrate 50). The upper perimeter portion 100P' may correspond to the first face ply 102' and the first adhesive layer 108A', and the lower perimeter portion 100P'' may correspond to the intermediate liner ply 110', the second adhesive layer 108B', and the second face ply 103'. In operation, the upper perimeter portion 100P' may be the portion of the label 100' layers that resides outboard or surrounds the first central portion 107A', and the lower perimeter portion 100P'' may be the portion of the label 100' layers that resides outboard or surrounds the second central portion 107B'. Due to the lines of weakness 106', the perimeter portions 100P' and 100P'' may be separable from their respective central portions 107A' and 107B'. For example, the lines of weakness 106' may be exploited to remove the lower perimeter portion 100P'' from the second central portion 107B', thus exposing the first adhesive layer 108A', as is shown in FIG. 6A. In this manner, the label 100' may be made ready for adherence to the substrate 50.

The lines of weakness 106' may be perforations, die cuts, folds, or any other suitable feature that enables separation of the central portions 107A', 107B' from the perimeter portion 100P', 100P''. The lines of weakness 106' may extend through some or all of the layers of the label 100' (e.g., the face plies 102', 103', the adhesive layers 108A', 108B', the intermediate liner layer 110', et cetera), and may define the central portions 107A', 107B'. Put another way, in embodiments, the central portions 107A', 107B' may reside entirely within the lines of weakness 106'. In operation, the lines of weakness 106' may be broken to allow a user to separate the central portions 107A', 107B' from the rest of the label 100'. In cases where the label 100' is adhered to the substrate 50 and the central portions 107A', 107B' are thereafter separated from the label 100' along the lines of weakness 106', the rest of the label 100' (i.e., the perimeter portion 100P') (see FIG. 9C) may be left behind on the substrate 50. In some embodiments, there may be at least four lines of weakness 106' that define the central portions 107A', 107B' (see FIG. 8), though this need not be the case. Alternate arrangements of lines of weakness 106' are contemplated herein, such as two lines of weakness 106' that extend the entire length of the label 100'. In such an embodiment, the perimeter portions 100P', 100P'' of the label 100' may consist of two strips on opposing sides of the central portions 107A', 107B'. In other embodiments, the lines of weakness 106' define two or more central portions 107A' and/or 107B' within the label 100'. In such cases, the lines of weakness 106' may allow for further separation of the central portions 107A' and/or 107B' from each other. For example, as shown in the embodiment depicted in FIG. 7B, the first face ply 102' may have an additional line of weakness 106A' spanning the width of the first central region 107A', thus allowing for the separation of the first central region 107A' into smaller portions 107AA' and 107AB'. These separate, smaller portions 107AA' and 107AB' may themselves each be adherable to the same or another substrate 50. In other embodiments still, the label 100' may have any suitable number, size, shape, and/or arrangement of central portions 107A', 107B' and lines of weakness 106'.

Generally, indicia printed on the first face ply 102' may be public indicia (e.g., shipping information, warning labels, return labels, 2D barcodes, QR codes, etc.) and indicia printed on the second face ply 103' may be private indicia (e.g., packing lists, return labels, promotional offers, et cetera). In operation, the indicia on the first face ply 102' may be viewed by anyone who views the package to which the label 100' is adhered (i.e., after the lower perimeter portion 100P" is removed and the first adhesive layer 108A' had been exposed). The recipient of the package may use the lines of weakness 106' to remove both the central portions 107A', 107B' from the upper perimeter portion 100P' of the label 100', and may then view the indicia printed on the second face ply 103'.

In embodiments, because the second face ply 103' may have no adhesive on the lower side 103L' thereof, the label 100' may be secured to the substrate 50 only by way of the first adhesive layer 108A' that is exposed along the upper perimeter portion 100P' (see FIGS. 9A-9E). In this way, the central portions 107A', 107B' themselves may not be fixedly secured to the substrate 50 when the label 100' is initially secured to the substrate 50. The central portions 107A', 107B' may thereafter be readily removed from both the rest of the label 100' and the substrate 50 along the lines weakness 106'. The first face ply 102' may subsequently be removed from the intermediate liner ply 110' and the first face ply 102' may be adhered to the same or another substrate 50. In this way, the previously hidden indicia on the second face ply 103' may be exposed for viewing and/or the first face ply 102' may be reused. For instance, the second face ply 103' may have a packing list printed thereupon, and the first face ply 102' may have a return label printed thereupon which may be reapplied to a package after being separated from the second face ply 103'.

Figure 7:
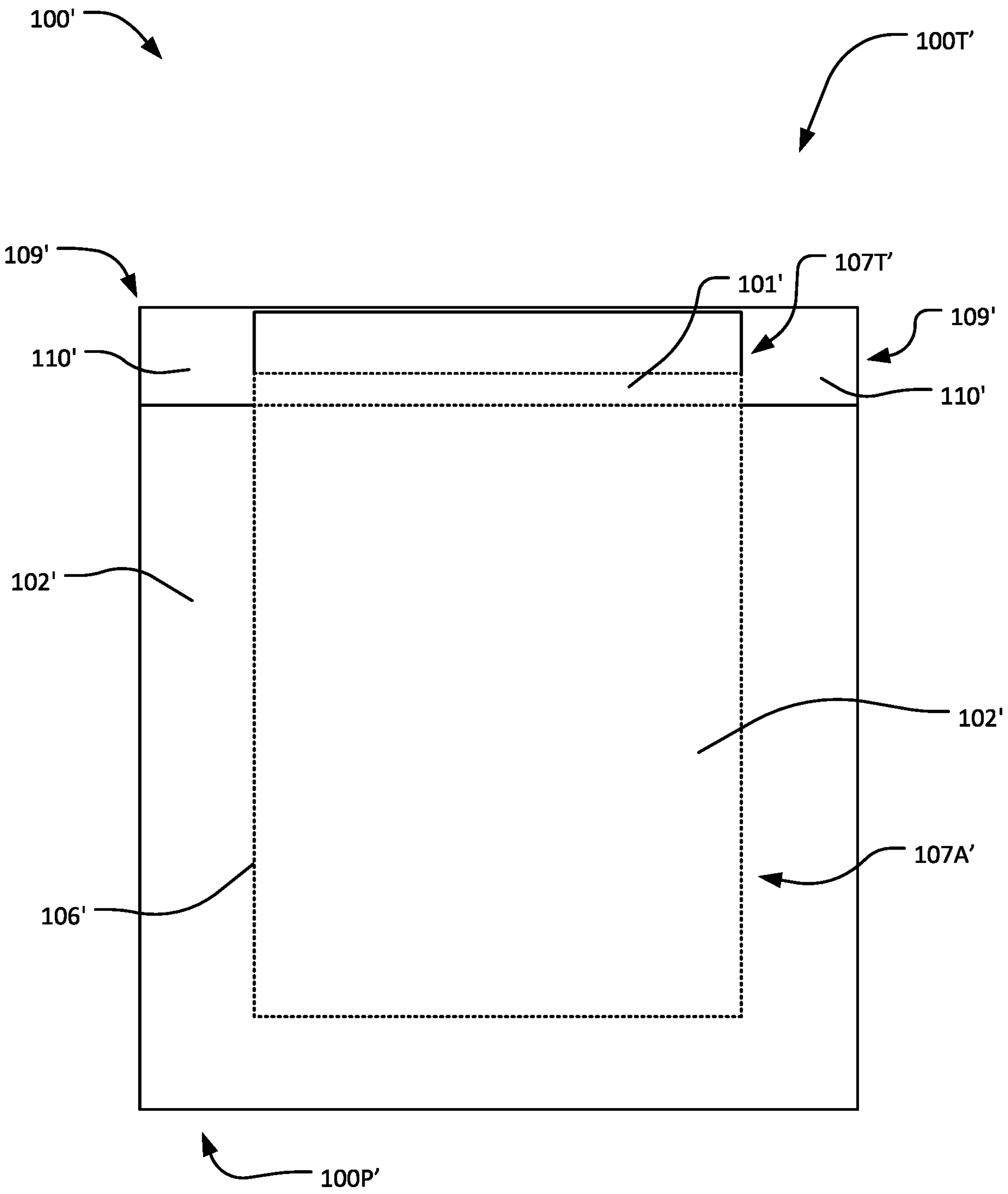
FIG. 7 is a top view of the duplex label employing the single sided intermediate liner of FIG. 6.

Moving now to FIG. 7, the top side 100T' of the label 100' is shown. The first central portion 107A' may be delineated by the lines of weakness 106' in the first face ply 102' and the first adhesive layer 108A'. In embodiments, at least some of the lines of weakness 106' extend through each of the first face ply 102', the adhesives layers 108A' and 108B', the liner ply 110', and the second face ply 103'. The lines of weakness 106' may also delineate a tear away portion 101' located at a top area 107T' of the first face ply 102' and/or the second face ply 103' (i.e., the lines of weakness 106' may form a tear away portion 101' in each of the face plies 102' and 103', the adhesive layers 108A' and 108B', and the liner layer 110'). In some embodiments, the tear away portion 101' may be coextensive with the central portions 107A', 107B' (i.e., a width or height of the tear way portion 101' may be the same as a width or height of the central portions 107A', 107B'). The tear away portion 101' may be configured to be removed from the label 100' to facilitate the removal of the central portions 107A', 107B' from the upper perimeter portion 100P', for instance, after the label 100' is secured to the substrate 50. That is to say, removing the tear away portion 101' may allow a user to slip a finger or other tool underneath the central portions 107A', 107B' and remove them from the rest of the label 100' via the lines of weakness 106'. Without the tear away portion 101', a user may have more difficulty acquiring the necessary amount of space and/or leverage required to remove the central portions 107A', 107B' from the perimeter portion 100'P. In embodiments, there may be one or more tear away portions 101', and these one or more tear away portions 101' may be located adjacent the central portions 107A', 107B', such as a left, right, or bottom side of the central portions 107A', 107B'.

Some embodiments, such as the one shown in FIG. 7, may have one or more shoulders 109' that corresponds to the tear away portion 101'. The shoulders 109' may be one or more portions that are devoid of one or more layers (e.g., all layers, all layers but the layers comprising the lower perimeter portion 100P" (FIG. 8), etc.) of the label 100' that leaves at least a portion of a side of the tear away portion 101' exposed. In operation, the combined tear away portion 101' and shoulders 109' may provide space for the user to remove the central portions 107A', 107B' from the label 100' after the label 100' is adhered to the substrate 50. The shoulders 109' may be on any suitable side (e.g., top, left, right, bottom) of the tear away portion 101' that facilitates access to the tear away portion 101' by the user. The shoulders 109' may also be any suitable shape or size to facilitate user access to the tear away portion 101'. For example, in some embodiments, the shoulders 109' may have a width greater than a width of the tear away portion 101'. In other embodiments, the shoulders 109' may have a width equal to or greater than the top portion 107T' of the face plies 102' and 103'. In embodiments, the tear strip 107T' may be inset or its edges may be coplanar with the line of weakness 106', and the shoulder 109' (which may be devoid of the first face ply 102', the liner ply 110', the second face ply 103') may facilitate the tearing of the tear away portion 101' and allow for easier access to the perimeter portion.

Figure 7A:
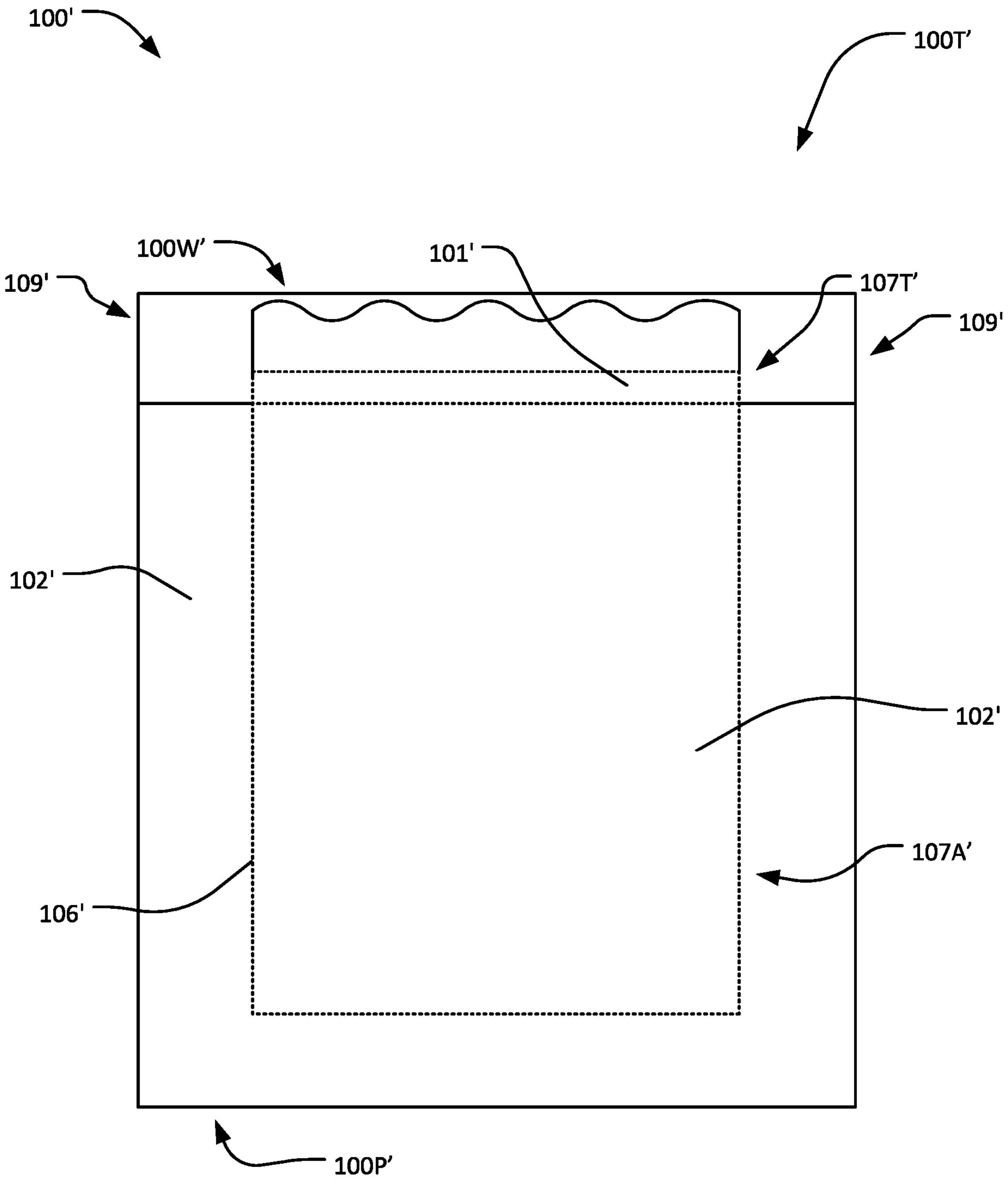
FIG. 7A is a top view of the duplex label employing the single sided intermediate liner of FIG. 6, according to another embodiment.
Figure 7B:
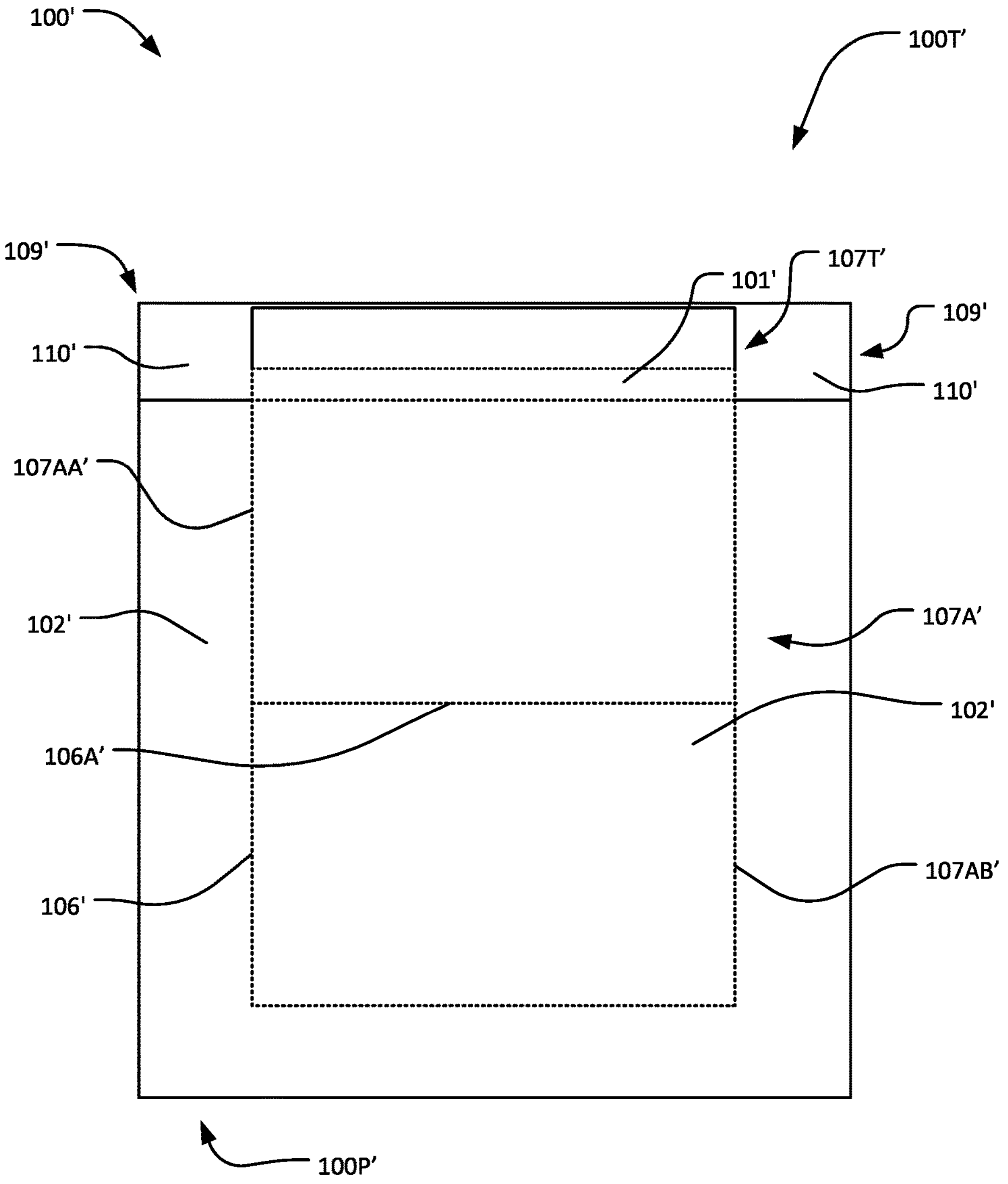
FIG. 7B is a top view of the duplex label employing the single sided intermediate liner of FIG. 6, according to yet another embodiment.

FIG. 7A shows another embodiment of the label 100', with a modified top area 107T'. Sometimes edges, and most commonly a top or forward edge, of conventional labels may get caught and/or torn when passing through machinery (e.g., a printer, an application machine, et cetera). Instead of having a relatively straight edge for a perimeter edge of the label 100', the top area 107T' may have a shaped edge 100W'. The shaped edge 100W' may be any suitable non-straight shape, such as a wavy shape, a zig-zag shape, et cetera. In operation, the edge 100W' may provide less label 100' surface area around the top area 107T' relative to a straight perimeter edge. Because there may be less area of the label 100' available for catching on machinery, the label 100' with the shaped edge 100W' may be less prone to jamming or tearing on equipment when compared to conventional labels.

Figure 8:
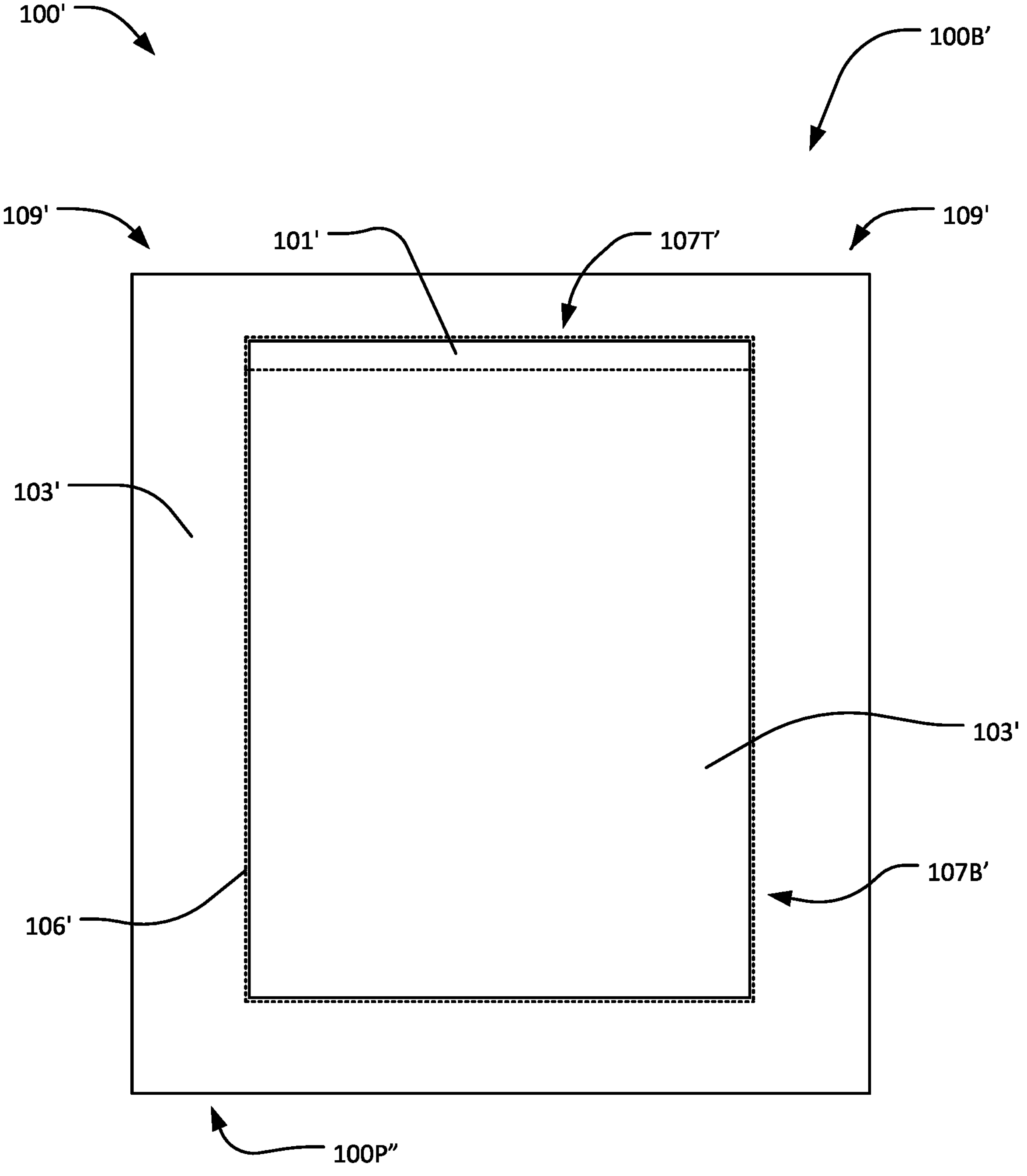
FIG. 8 is a bottom view of the duplex label employing the single sided intermediate liner of FIG. 6.

FIG. 8 shows a bottom side of the label 100' before the lower perimeter portion 100P" is removed. Here, the lines of weakness 106' are seen bounding the second central portion 107B', and the tear away portion 101' resides at a top part 107T' of the second central portion 107B'. In embodiments, the lines of weakness 106' may be what facilitates the separation of the lower perimeter portion 100P" of to expose the first adhesive layer 108A', as opposed to a separate die cut or other operation (i.e., where the label 100' is constructed with the lower perimeter portion 100P" already removed or not present).

Figure 8A:
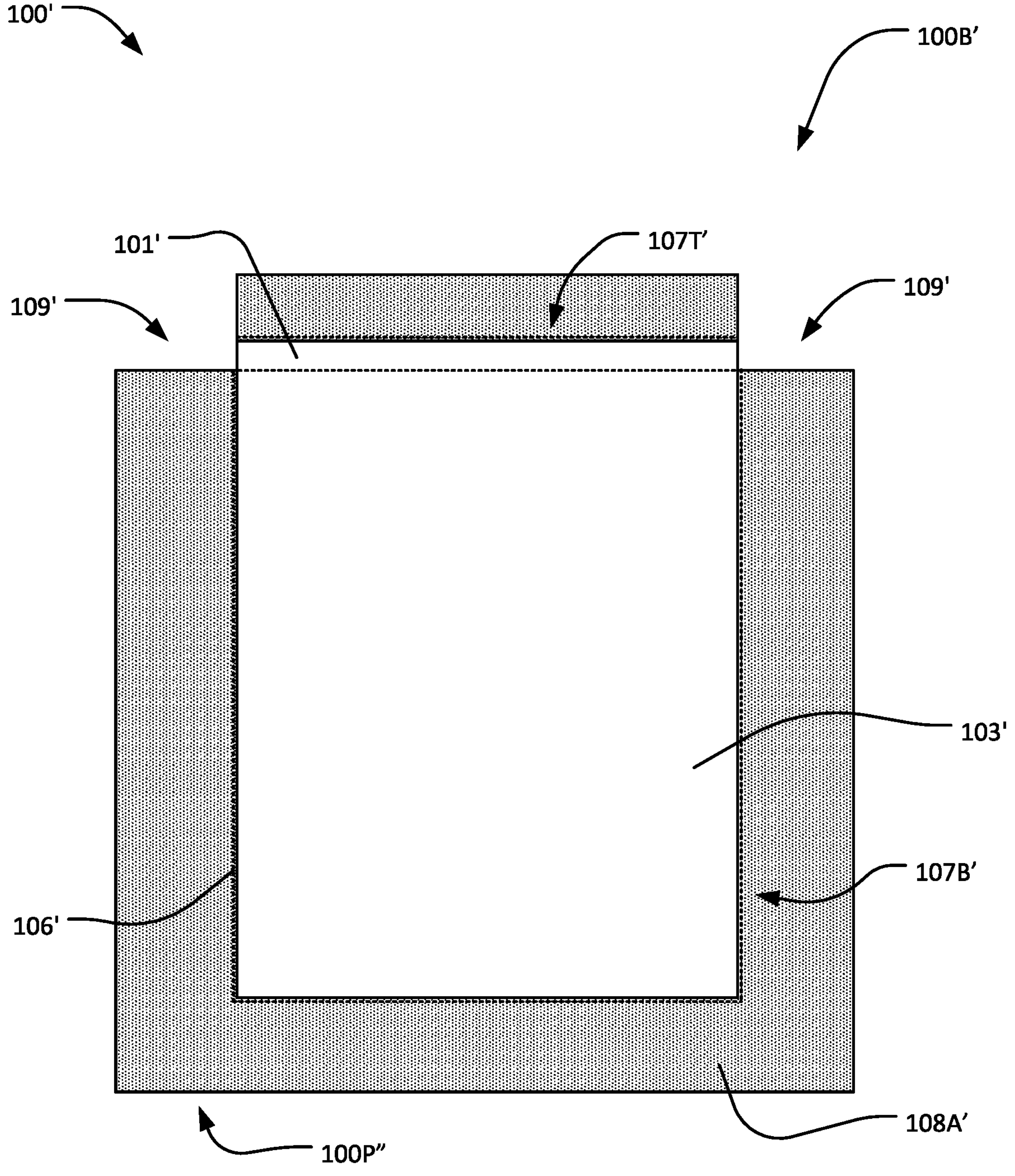
FIG. 8A is a bottom view of the duplex label employing the single sided intermediate liner of FIG. 6, in the use configuration.

FIG. 8A shows a bottom side 100B' view of the label 100' in the use configuration, i.e., after the lower perimeter portion 100P" has been removed. Here, the perimeter portion 100P' of the first adhesive layer 108A' is exposed (e.g., by virtue of the lower perimeter portion 100P", consisting of portions of the second face ply 103', the liner layer 110', and the second adhesive layer 108B' being removed). The lines of weakness 106' in the first adhesive layer 108A' are seen bounding the second face ply 103', and the tear away portion 101' resides at the top part 107T' of the central portion 107B'. The shoulders 109' are depicted as voids here since the shoulders 109' may be categorized as initially containing no upper perimeter 100P' layers (e.g., the first face play 102' and the first adhesive layer 108A'). Since the label 100' shown in FIG. 8A has had the lower perimeter portion 100P" (e.g., the liner layer 110', the second adhesive layer 108B', and the second face ply 103') already removed, this may leave the label 100' devoid of any layers at the shoulders 109'.

In embodiments, one or more (e.g., all) of the corners of the label 100' layers and/or the central portions 107A', 107B' may be rounded or filleted. For example, some or all of the corners of the label 100' that are in the vicinity of the shoulders 109' and/or the tear away portion 101' may be rounded to facilitate user access thereto.

Figure 9A:
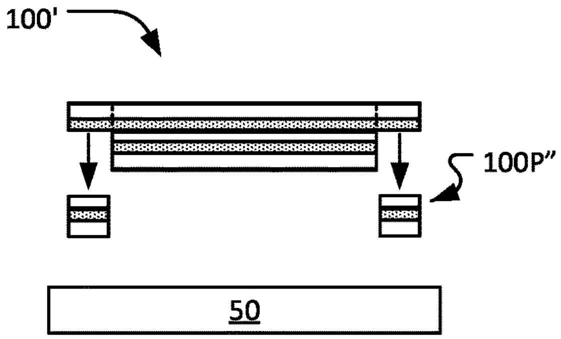
FIGS. 9A-9E are schematic representations of an example operation of the duplex label employing the single sided intermediate liner of FIG. 6.
Figure 9B:
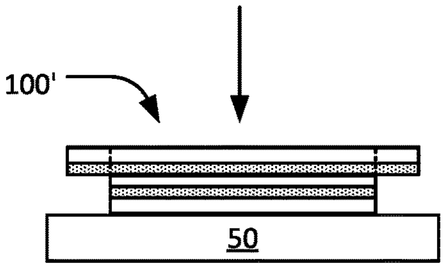

Attention is now directed FIGS. 9A-9E, where example operation of the duplex label 100' with intermediate liner 110' is illustrated. Sets of indicia may be printed on one or both of the face plies 102', 103' prior to adherence of the label 100' to a substrate 50. These sets of indicia may be printed simultaneously (i.e., with a single pass of the label 100' through a printer) or subsequently (i.e., with multiple passes through a printer). As shown in FIG. 9A, a user may prepare the label 100' for securement to the substrate 50 by removing the lower perimeter portion 100P". Specifically, portions of the second face ply 103', the second adhesive layer 108B', and the liner ply 110' outboard the lines of weakness 106' (FIG. 6A) may be removed and discarded to expose a portion of the first adhesive layer 108A'. Alternately, the first adhesive layer 108A' may have previously been exposed (e.g., by constructing the label 100' without the lower perimeter portion 100P"). The label 100' may thus be securable to the substrate 50 by nature of the exposed first adhesive layer 108A', such that the top side 102U' of the first ply 102' is visible and the second ply 103' is shielded from view, as shown in FIG. 9B. FIG. 9B shows the label 100' (e.g., the first adhesive layer 108A' thereof) being brought into contact with the substrate 50 for adhesion therebetween. This is how the label 100' may initially be secured to the substrate 50.

Figure 9C:
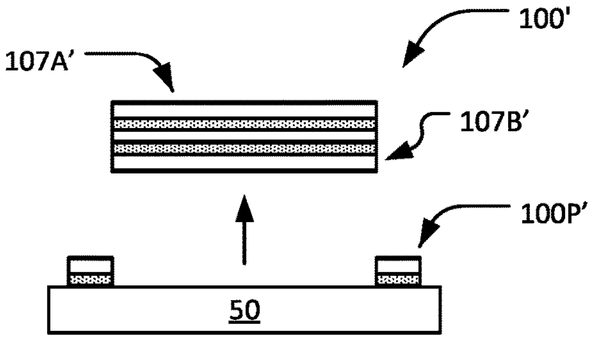
Figure 9D:
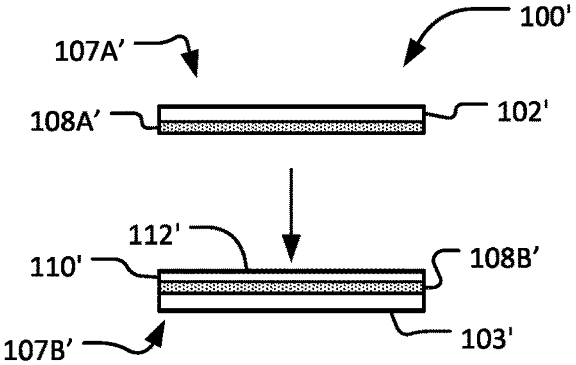
Figure 9E:
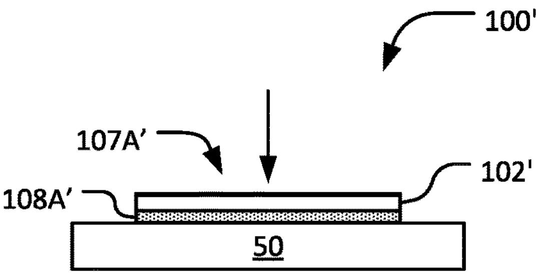

When desired, the user may tear the tear away portion 101' and use the lines of weakness 106' to remove the central portions 107A', 107B' from the remainder of the label 100' (i.e., from the upper perimeter portion 100P', which may remain adhered to the substrate 50) (FIG. 9C). In this way, the user may access the indicia on the second ply 103'. As can be seen in FIG. 9D, by virtue of the releasable properties of the intermediate liner ply 110', the first central portion 107A' (i.e., the first face ply 102' and the first adhesive layer 108A' with it) may be separated from the second central portion 107B' (i.e., the second face ply 103', the intermediate liner 110', and the adhesive 108B' therebetween). In embodiments, the second central portion 107B' may alternately be removed from the intermediate liner ply 110' (e.g., in cases where the liner ply 110' has releasable properties on only the liner ply lower side 110L'). Finally, as shown in FIG. 9E, the separated first central portion 107A' may be adhered (e.g., via the first adhesive layer 108A') to the same or another substrate 50. There, the indicia on the first face ply 102' may now be displayed upon the substrate 50. In embodiments where the second face ply 103' is instead temporarily adhered to the liner ply 110', the second face ply 103' may alternately be re-adhered to the same or another substrate 50 via the second adhesive layer 108B'.

Figure 10:
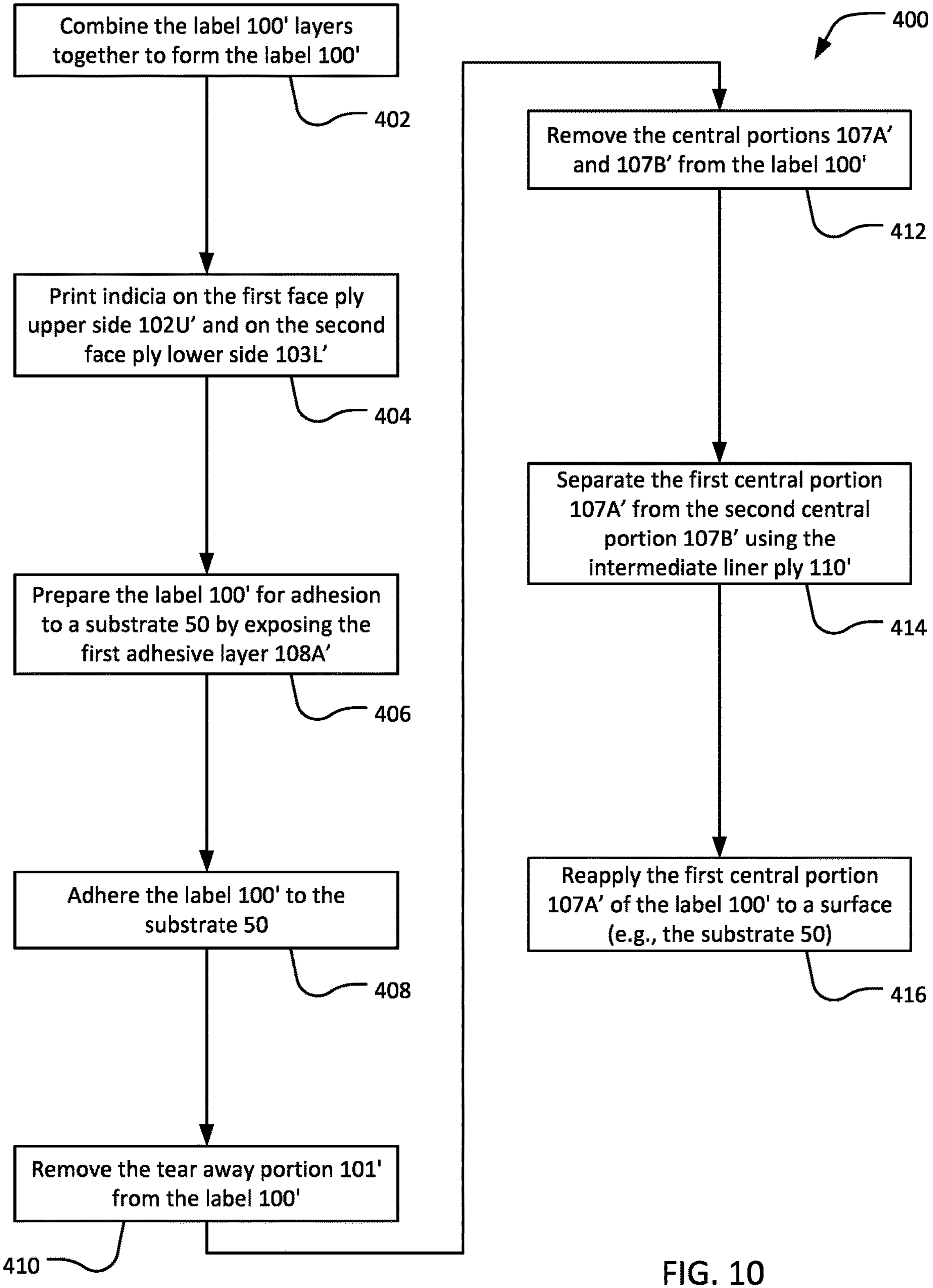
FIG. 10 is a flow chart illustrating a method of using the duplex label employing the single sided intermediate liner of FIG. 6.

FIG. 10 is a flow chart illustrating a method 400 of making and using the label 100', in an embodiment. The FIGS. 9A-9E previously described may illustrate at least some of the performance of the method 400, in embodiments. At step 402, the label 100' is constructed by combining the first face ply 102', the first adhesive layer 108A', the intermediate liner ply 110', the second adhesive layer 108B', and the second face ply 103' together, as described previously. Any desired coatings (e.g., printable coating 104', 105', releasable coatings 112', etc.) may be applied as well. The releasable coating 112' may be present on only a single side of the liner ply 110', such that only one of the first face ply 102' and the second face ply 103' is releasably adhered to the liner ply 110' and the remaining ply is fixedly secured to the liner ply 110'. During this time is where other features may be included in the label 100', such as the lines of weakness 106', the tear away portion 101', the shoulders 109', et cetera. Thereafter, at step 404, the first face stock 102' (e.g., the upper side 102'U thereof) and the second face stock 103' (e.g., the lower side 103'L thereof) may be provided with printed matter. This step may be accomplished using any suitable printing technique to print indicia (e.g., text, images, colors, private indicia, general or public indicia, etc.), such as inkjet printing, laser printing, direct thermal printing, thermal transfer, et cetera. The indicia may be printed simultaneously (e.g., both sides of the label 100' may receive indicia with a single pass through a printer) or the label 100' may use multiple passes through a printer to print the indicia on both of the face plies 102', 103'.

Then, at step 406 (and shown in FIG. 9A), the first adhesive layer 108A' is readied for application of the label 100' to the substrate 50. For instance, the user may remove the lower perimeter portion 100P" of the second face ply 103' to expose part of the first adhesive layer 108A'. In other embodiments, the first adhesive layer 108A' may be pre-exposed, such as when the label 100' is constructed without the lower perimeter portion 100P". Then, at step 408 (and shown in FIG. 9B), the exposed portion of the first adhesive layer 108A' may be used to adhere the label 100' to the substrate 50. In this way, the indicia printed on the first face ply 102' may be available for viewing, while the indicia printed on the second face ply 103' may be hidden by virtue of being sandwiched between the label 100' and the substrate 50.

The receiver of the substrate 50 (or another user) may then, at step 410, remove the tear away portion 101' from the label 100'. The tear away portion 101' may be removed by exploiting the shoulders 109' and the lines of weakness 106'. Then, at step 412 (as seen in FIG. 9C), the central portions 107A', 107B' of the label 100' may be removed from the rest of the label 100' along the lines of weakness 106'. The upper perimeter portion 100P' of the label 100' may be left adhered to the substrate 50 as a result.

Next, at step 414 (and seen in FIG. 9D), the user may separate the first face ply 102' from the second face ply 103' using the intermediate liner ply 110'. In other words, the first central portion 107A' may be separated from the second face ply 103' using the intermediate ply 110'. Because the intermediate liner ply 110' has releasable properties on the one side (e.g., by inherently having releasable properties and/or by having one or more releasable coatings 112'), the intermediate liner ply 110' may indirectly and temporarily join the first face ply 102' and the second face ply 103' together, as discussed above. The intermediate ply 110' may remain with the face ply 102' or 103' to which it was fixedly adhered to. As a result, the adhesive layer 108A' or 108B' attached to the separated face ply 102' or 103', respectively, may now be exposed for further adhesion to a surface. Then, at step 416 (and seen in FIG. 9E), the user may adhere the first central portion 107A' to the same or another substrate 50. For instance, the first adhesive layer 108A' associated with the first face ply 102' may be exposed by removing the liner ply 110' and brought into contact with the substrate 50.

It is understood that the steps of the method 400 may be modified, added to, and/or omitted as desired. For example, the step of separating and applying a plurality of central portions 107A', 107B' may be added in embodiments where the label 100' includes multiple central portions 107A', 107B'. As another example, the steps of separating the second central portion 107B' from the liner ply 110' and reapplying the second central portion 107B' via the second adhesive layer 108B' to the same or another substrate 50 may be included where the second face ply 103' is instead releasably secured to the liner ply 110'.

In use, the label 100' may provide for a label that may be printed on both a front and a back side. When applied to the substrate 50, the indicia printed on the second face ply 103' may be obscured. The user may use the shoulders 109' and the tear away portion 101' to remove the central portions 107A', 107B' of the label 100', leaving behind the upper perimeter portion 100P' of the label 100'. Once removed, the indicia that was previously obscured may now be viewed by the user. In embodiments, the bottom 100B' of the second central portion 107B' may have no appreciable adhesion, and the label 100' is secured to the substrate 50 only by way of that part of the first adhesive layer 108A' that is exposed once the lower perimeter portion 100P" is removed. In this way, the central portions 107A', 107B' themselves may not be fixedly secured to the substrate 50 upon initial application of the label 100' to the substrate 50. Thus, the central portions 107A', 107B' may be readily removed from the label 100' and the substrate 50 once the lines of weakness 106' are broken. The central portions 107A' or 107B' may be subsequently attached to the same or another surface.

Embodiments of the label 100' described herein may provide for a label that may allow portions thereof to be reapplicable. Because only one side of the liner ply 110' may have a releasable coating 112', only one of the face plies 102' and 103' may be separable therefrom. Therefore, only one of the face plies 102' or 103' may be readherable. Meanwhile the other portion (i.e., comprising a face ply fixedly adhered to the liner layer by an adhesive layer) may be advantageously printable upon. Due to the intervening adhesive layer, the face ply that is fixedly adhered to the liner ply may be printed upon without damaging or otherwise interfering with the liner ply. Printing directly upon the liner ply to simulate the effects of double sided printing (e.g., with a conventional single sided label having a face ply and an opposing liner ply) may, for example, damage the releasable coating of the liner ply, thereby reducing its efficacy. Embodiments of the label 100' described herein may provide for a separable label that may receive double sided printing without having to use complex, costly, specially designed liner layers that directly receive printing. Further, the cost and difficulty of manufacturing the label 100' embodiments may be kept relatively low by only having to use a single releasable coating on the liner ply.

Fixedly adhering a face ply to the liner ply may also advantageously modify characteristics of the face ply. For instance, the liner ply may reinforce the face ply it is fixedly adhered to. As another example, adhering a face ply to a liner ply may allow a greater range of types of printing to be used to print indicia on a label backside, such as direct thermal printing.

Embodiments of the label 100' described herein may provide for a label that may be advantageously printed on both sides (e.g., simultaneously or in sequence). The label 100' embodiments described herein may also provide for a label that advantageously reduces the amount of liner waste associated with conventional labels. For instance, the label 100' described herein may utilize only a single liner layer for what equates to two labels (i.e., the first face ply 102' and the second face ply 103' may be provided with different indicia, and at least one of the face plies 102', 103' may be applied separately from the other). Relative to conventional labels, embodiments of the label 100' described herein may use half the amount of liner layers for the same amount of labels. This means that the label 100' may advantageously have a reduced cost (e.g., materials cost, construction cost) compared to conventional labels. Reducing the amount of liner layers may also reduce the environmental impact of liner waste. Further, by requiring only a single liner layer in embodiments, the label 100' may provide for a duplex label that is relatively thin. A relatively thin label may be advantageous because the thin label takes up less space when stored (e.g., on a label roll or in a label stack) when compared to a relatively thicker label. This may provide a reduced cost in storing and/or transporting the thinner label.

Thus, as has been described, the duplex label with single sided intermediate liner layer concepts disclosed herein may serve to minimize traditional liner and releasable coating usage, and in so doing, provide a duplex label that is relatively more environmentally friendly. Moreover, the duplex labels using the intermediate liner concepts disclosed herein may provide for a label that is versatile and usable in many different types of applications and configurations.

FIGS. 11-13 and 14-16 depict embodiments 1000 and 1000', respectively, of a liner-less label having a coated polyester ply. The embodiments 1000, 1000' may substitute the use of a paper ply for a polyester ply (i.e., the embodiments 1000, 1000' may be devoid of paper). A label using a polyester ply has some advantages over a label using a ply made of paper. For example, polyester plies are generally more robust than paper plies, and can better withstand the stresses of printing and use.

Polyester, when used in business forms, is generally not transparent. The artisan avoids using clear polyester plies in the final product since their clear nature hinders the legibility of any indicia printed thereon. To rectify this issue, the polyester material is dyed (e.g., with a coloring agent or polymer) with a desired color during the manufacturing process. The resulting polyester material is colored through-and-through, and any ply made therefrom likewise has an opaque aesthetic throughout its entire thickness.

While the conventional colored polyester plies may more closely match the look of a traditional paper ply, these colored polyester plies tend to be more laborious and expensive to make than their paper counterparts. Clear polyester plies are not used, despite their lower cost, because the visibility of any matter printed on the polyester ply is paramount in label and business form applications. A label or business form having indicia that is difficult for a user to view or decipher runs counter to the purpose of the label/business form. But the increased costs and labor associated with dying or impregnating the polyester with color are undesirable.

Embodiments of the disclosure herein may provide for a label that uses a clear polyester ply having a colored surface coating that mitigates at least in part the disadvantages of a label having traditional polyester plies impregnated with color. The clear polyester may not undergo the conventional coloring process where the polyester is dyed during manufacture. Instead, the visibility of indicia printed on the clear polyester may be increased via a colored coating applied to a surface of the clear polyester. The surface coating may use a relatively lesser amount of material compared to the amount needed to color polyester all the way through. Thus, the coated polyester ply described herein may be more cost effective and less labor intensive than a conventionally colored polyester ply.

The coated polyester ply concept described herein may be used in place of or as a substitute for any paper layer and/or polyester layer of the label and business form embodiments described previously. For example, the coated polyester ply concept may be used instead of one or more of the polyester liner 130 of the business form 100, the paper plies 112, 122 of the business form 100, the face plies 102', 103' of the label 100', the intermediate liner 110' of the label 100', et cetera.

Figure 11:
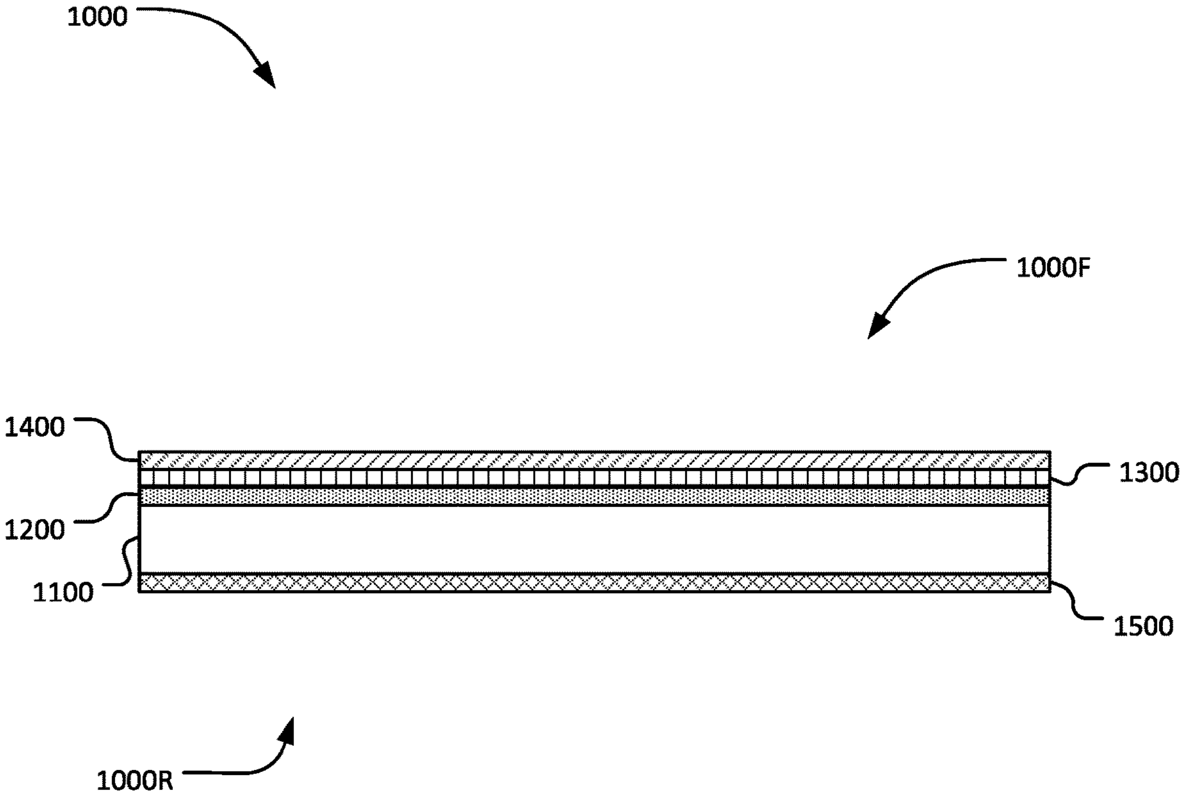
FIG. 11 is a schematic representation of a clear polyester label employing an opaque coating, according to an embodiment of the disclosure.
Figure 12:
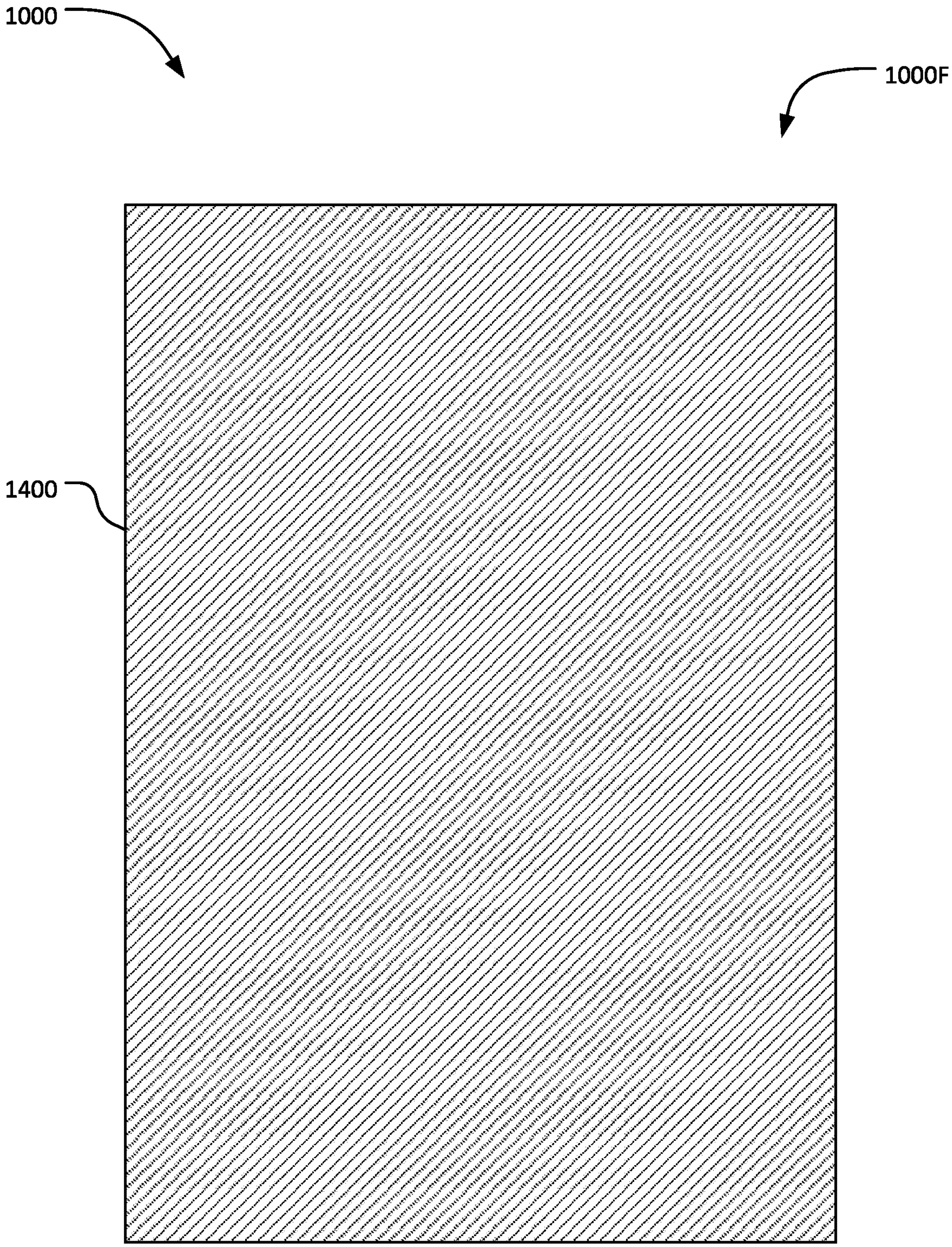
FIG. 12 is a front view of the clear polyester label employing the opaque coating of FIG. 11.
Figure 13:
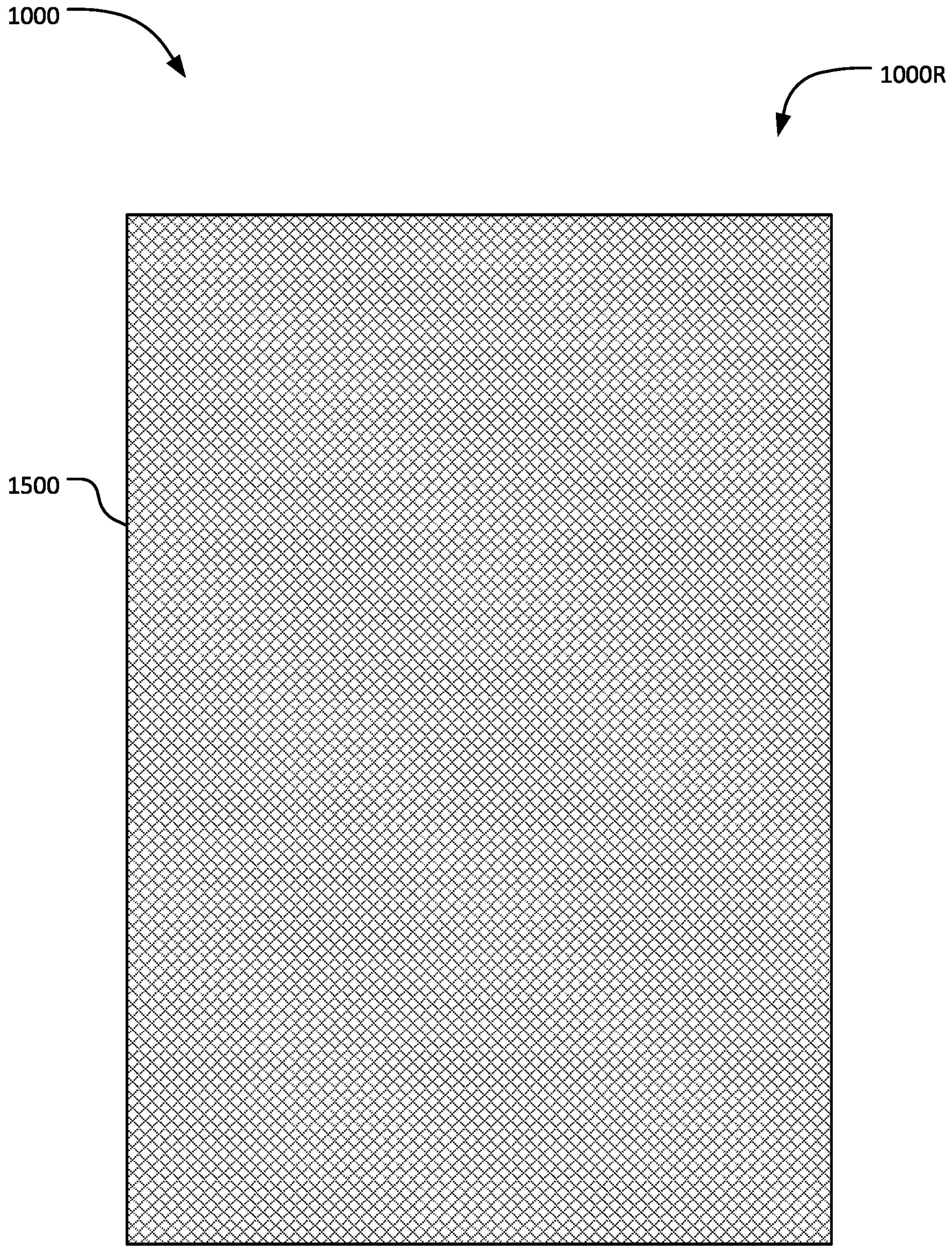
FIG. 13 is a rear view of the clear polyester label employing the opaque coating of FIG. 11.

Attention is now directed to FIGS. 11-13, where an embodiment 1000 of a label (e.g., a liner-less label) having a clear polyester ply is shown. The label 1000 may comprise, starting from a front side 1000F of the label 1000 and moving to a rear side 1000R of the label 1000, a release layer 1400, a printable coating 1300, a colored coating 1200, a clear polyester layer 1100, and an adhesive layer 1500. In operation, the printable coating 1300 may facilitate the printing of indicia (e.g., text, graphics, images, information, etc.) on the clear polyester ply 1100. The colored coating 1200 may improve the readability or legibility of this indicia by increasing a surface opaqueness of the clear polyester ply 1100. The adhesive 1500 may be used to secure the label 1000 to a suitable surface or substrate by the user. The release layer 1400 may preclude the label 1000 from unduly attaching to other labels which the label 1000 comes into contact with. For example, a plurality of labels 1000 pressed together in a roll may only be temporarily fixed to each other due to the releasable bond between the contacting release layers 1400 and adhesive layers 1500. In embodiments, the label 1000 may be completely devoid of paper plies.

In contrast to conventional colored polyester plies, the clear polyester ply 1100 may have a non-opaque or less-than-opaque (e.g., transparent, translucent, see-through, etc.) appearance. This effect may be achieved by, for example, foregoing a coloring agent, granule/polymer, or dying process when manufacturing the polyester ply. The clear polyester ply 1100 may have a thickness of about 0.5-3 mils. In a preferred embodiment, the clear polyester ply 1100 may have a thickness under about 2 mils. In another preferred embodiment, the clear polyester ply 1100 has a thickness of about 1.2 mils. In still another preferred embodiment, the clear polyester ply 1100 may have a thickness at about 2 mils and below. The clear polyester ply 1100 may be relatively thinner than conventional colored polyester plies, which typically have a thickness of 3 mils and above.

The colored coating 1200 may be applied to one or more faces 1000F, 1000R of the polyester ply 1100 to change the appearance thereof. The colored coating 1200 may be, for example, an ultraviolet (UV) cured ink coating which is applied to a surface of the polyester ply 1100. As another example, the colored coating 1200 may be an aqueous or water based coating applied to the surface of the polyester ply 1100. While the interior appearance or volume of the polyester layer 1100 may remain unchanged by the colored coating 1200, the outward appearance of the polyester layer 1100 may become less see-through. Such a coated polyester layer 1100 may have an operational appearance like that of conventional colored polyester layers without incurring the cost normally associated therewith.

The colored coating 1200 may, in embodiments, only cover one surface of the polyester ply 1100. For instance, as shown in FIG. 11, the colored coating 1200 may cover only the front surface 1000F of the polyester ply 1100, while the rear surface 1000R thereof may be devoid of the coating 1200. In this case, the front surface 1000F of the polyester ply 1100 may have an opaquer appearance than the rear surface 1000R (i.e., the rear surface 1000R may be see-through). It is to be understood however, in other embodiments, that the colored coating 1200 may be suitably arranged in other fashions (e.g., arranged along only the rear surface 1000R of the polyester ply 1100, along both the front 1000F and rear 1000R surfaces of the polyester ply 1100, et cetera). In embodiments, the UV cured ink coating 1300 may be applied only on one or more sections of a surface of the polyester ply 1100, e.g., sections on which printed indicia is to be received.

The printable coating 1300 may be configured to receive indica from a desired printing process (e.g., inkjet, laser, direct thermal, thermal transfer, dot/line or impact matrix printing, et cetera). The type of printable coating 1300 available for use may be dependent on the arrangement of the release layer 1400, as discussed in greater detail below. As for the embodiment 1000 depicted in FIGS. 11-13, the release layer 1400 is shown to completely cover the printable coating 1300. The printable coating 1300 may be configured to receive direct thermal printing. Direct thermal printing may apply indicia to the polyester ply 1100 via heat transferred through a thickness of the release layer 1400.

The printable coating 1300 may, in embodiments, only cover one surface of the polyester ply 1100. For instance, as shown in FIG. 11, the printable coating 1300 may cover only the front surface 1000F of the polyester ply 1100, while the rear surface 1000R thereof may be devoid of the coating 1300. In this case, the front surface 1000F of the polyester ply 1100 may readily receive printed indicia. It is to be understood however, in other embodiments, that the printable coating 1300 may be suitably arranged in other fashions (e.g., arranged along only the rear surface 1000R of the polyester ply 1100, along both the front 1000F and rear 1000R surfaces of the polyester ply 1100, et cetera). In embodiments were printable coatings 1300 are arranged on more than one side of the clear polyester 1100, then duplex printing may be effectuated thereupon (e.g., printing on the more than one side sequentially, simultaneously, intermittently, et cetera).

The release layer 1400 may have releasable properties such that the release layer 1400 may temporarily adhere (as opposed to permanently affix) to an adhesive, such as the adhesive layer 1500. The release layer 1400 may comprise, for example, silicone material. In embodiments, the releasable layer 1400 may be arranged such that the layer 1400 corresponds to a shape, pattern, and/or location of the adhesive layer 1500. For example, the releasable material 1400 may be arranged on a side of the polyester ply 1100 opposing the side having the adhesive layer 1500, such that the releasable layer 1400 may contact and releasably adhere to the adhesive layer 1500 of an adjacent label 1000.

The releasable coating 1400 may, in embodiments, only cover one surface of the polyester ply 1100. For instance, as shown in FIG. 11, the releasable coating 1400 may cover only the front surface 1000F of the polyester ply 1100, while the rear surface 1000R thereof may be devoid of the layer 1400. In this case, only the front surface 1000F of the polyester ply 1100 may be precluded from unduly adhering to an adhesive. It is to be understood however, in other embodiments, that the releasable layer 1400 may be suitably arranged in other fashions (e.g., arranged along only the rear surface 1000R of the polyester ply 1100, along both the front 1000F and rear 1000R surfaces of the polyester ply 1100, et cetera).

The adhesive layer 1500 may comprise any suitable adhesive or combination of adhesive now known or subsequently developed. The adhesive layer 1500 used may be configured to fixedly secure the label 1000 to a substrate, such as a package or equipment, while only temporarily adhering to certain surfaces, such as the releasable layer 1400. In embodiments, the adhesive layer 1500 may be arranged such that the adhesive 1500 corresponds to a shape, pattern, and/or location of the releasable layer 1400. For example, the adhesive layer 1500 may be arranged on a side of the polyester ply 1100 opposing the side having the releasable layer 1400, such that the adhesive layer 1500 may contact and releasably adhere to the silicone layer 1400 of an adjacent label 1000.

The adhesive layer 1500 may, in embodiments, only cover one surface of the polyester ply 1100. For instance, as shown in FIG. 11, the adhesive layer 1500 may cover only the rear surface 1000R of the polyester ply 1100, while the front surface 1000F thereof may be devoid of the layer 1500. In this case, only the rear surface 1000R of the polyester ply 1100 may be adherable to a substrate. It is to be understood however, in other embodiments, that the adhesive layer 1500 may be suitably arranged in other fashions (e.g., arranged along only the front surface 1000F of the polyester ply 1100, along both the front 1000F and rear 1000R surfaces of the polyester ply 1100, et cetera).

In embodiments, one or more layers of the label 1000 may have an additional protective coating. The protective coating may confer benefits to the label 1000 layers, such as by increasing label 1000 resistance to wear and tear, moisture damage, et cetera. Applying the protective coating to the printable coating 1300 may preclude indicia printed thereupon from becoming marred or destroyed. One example of a suitable protective coating for use with the label 1000 may be RadKote®, manufactured by Actega, Inc., of Lincolnton, North Carolina.

Figure 4:
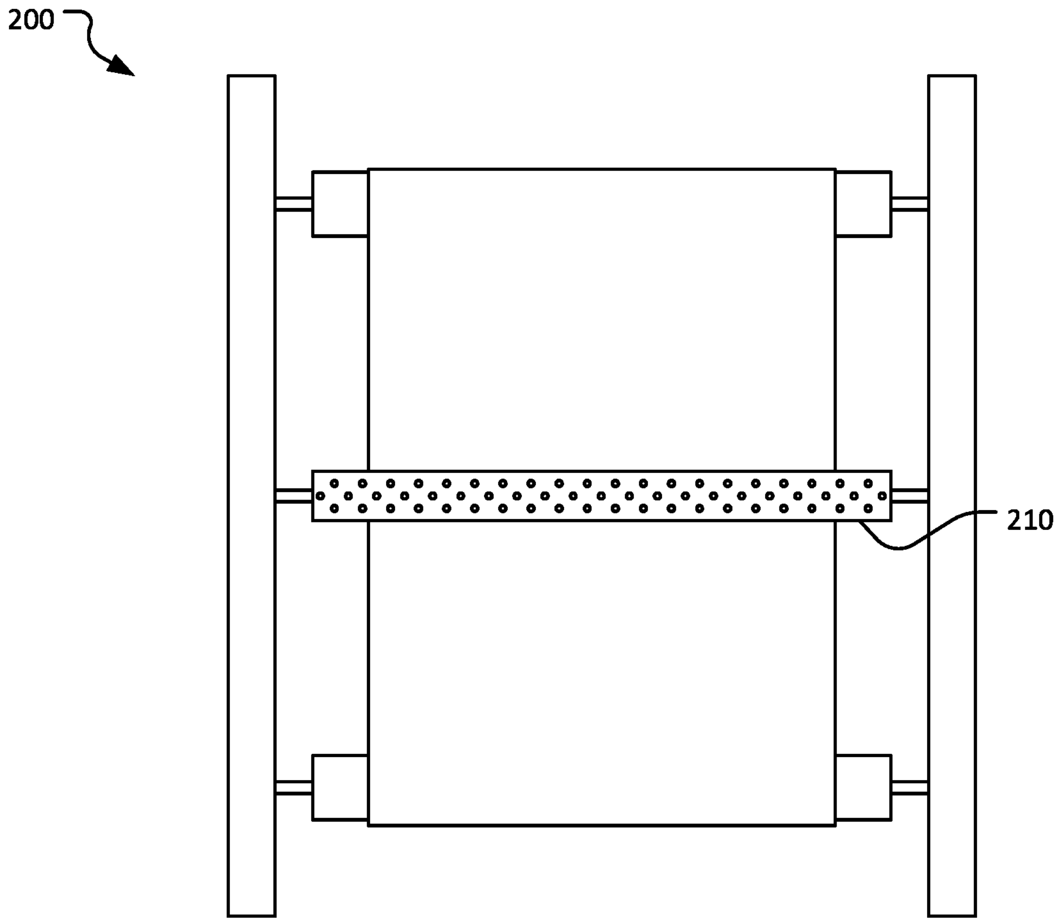
FIG. 4 shows a roller device for forming the polyester liner, according to an embodiment of the disclosure.

The clear polyester label embodiments described herein may make use of the skiving operations described above, with regards to the roller machine 200 of FIG. 4. Such embodiments of the clear polyester labels may have one or more layers which are relatively thinner than a corresponding layer of a conventional polyester label due to this skiving operation. Skiving the clear polyester layer may increase a surface roughness of the polyester layer, which may reduce the slipperiness of that layer. Furthermore, skiving the clear polyester layer may reduce the propensity of the polyester to build or collect a static charge.

In still more embodiments, the clear polyester label embodiments may be relatively thinner (e.g., by having a clear polyester label layer that is relatively thinner than a corresponding conventional layer) without the use of the roller machine 200 skiving operation. This thinness may be achieved, for example, by manufacturing a clear polyester ply, or other layer, with peaks and valleys or another similar pattern.

Embodiments of the label 1000 may provide an advantage over conventional paper or labels employing dyed polyester plies. The label 1000 may save on the costs of conventional paper plies since the label 1000 may be devoid of any paper plies. The label 1000 may emulate the appearance of a conventional paper ply label while being relatively more durable than the paper ply (i.e., being more resistant to wear and tear, moisture, et cetera). The label 1000 may be relatively thinner than the traditional colored polyester label, while being more cost effective. The label 1000 may also use relatively less polyester material due to the thinner polyester layers. Using the UV ink coating 1200 to change the outward appearance of the clear polyester 1100 may be cheaper than manufacturing a solidly colored polyester ply, e.g., using color impregnation processes. In some embodiments, the polyester ply 1100 with its coating 1200 may be about a third to half the cost of its conventionally colored polyester ply counterparts. Furthermore, the colored coating 1200 may be applied as sparingly as desired, such that the polyester ply 1100 surfaces have their appearance altered more efficiently (i.e., by using less resources). Whereas conventional colored polyester plies are colored wholesale, the clear polyester embodiments described herein may provide a similar aesthetic while reducing coloring agent waste.

The label 1000 embodiments may also reduce releasable liner waste. That is to say, the label 1000 may forego the use of a traditional release liner. Instead, the label 1000 may arrange release material thereon such that the release material of one label 1000 may temporarily adhere to and protect the adhesive layer of another label 1000 when the labels are arranged together (e.g., in a stack, fan-fold, roll, et cetera).

While the label embodiment 1000 depicted herein shows layers 1200, 1300, 1400, and 1500 covering an entirety of the front face 1000F and/or rear face 1000R of the clear polyester ply 1100, this need not be the case in every embodiment. In some embodiments, one or more of the layers 1200, 1300, 1400, and 1500 may only partially cover the front face 1000F and/or the rear face 1000R of the polyester ply 1100. For example, the colored coating 1200 and the printable coating 1300 may be foregone in the areas of the polyester ply 1100 that do not require printing. In other embodiments, the release layers 1400 and/or the adhesive layers 1500 may only partially cover a surface 1000F and/or 1000R of the polyester ply 1100. Here, the printable coating 1300 may be exposed for direct printing from a print head (i.e., without the interference of the layers 1400, 1500). In such embodiments, it is to be understood that the printable coating 1300 may be any other suitable printable coating now known or subsequently developed (e.g., laser printing, inkjet printing, et cetera).

Figure 14:
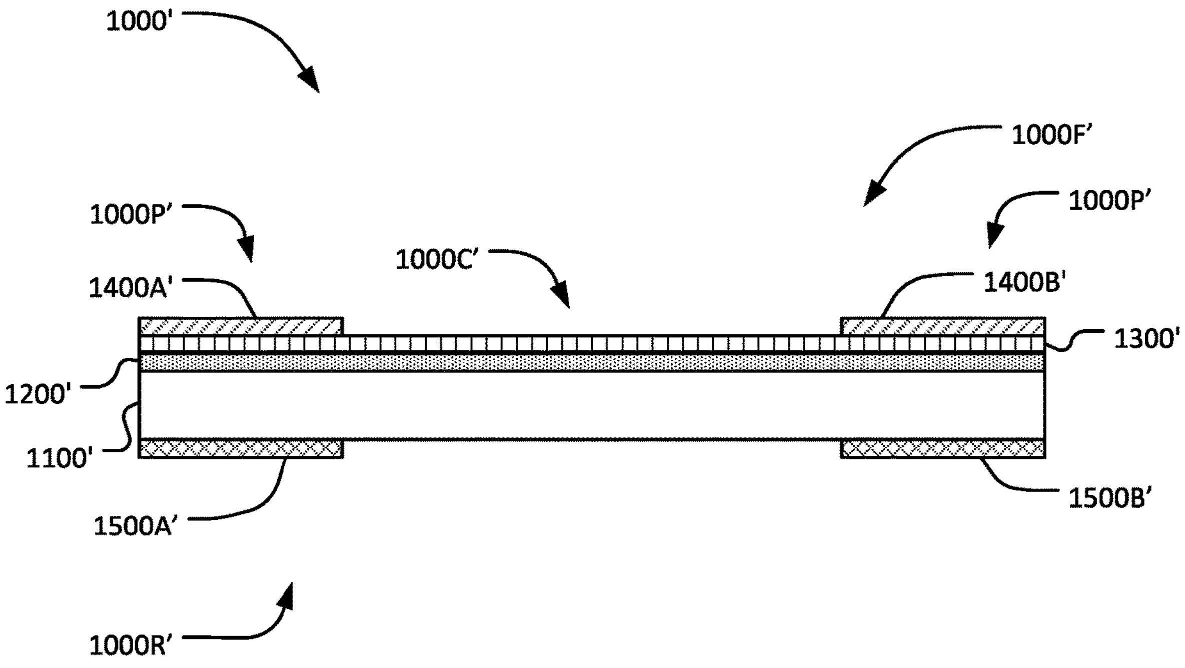
FIG. 14 is a schematic representation of a clear polyester label employing an opaque coating, according to another embodiment of the disclosure.
Figure 15:
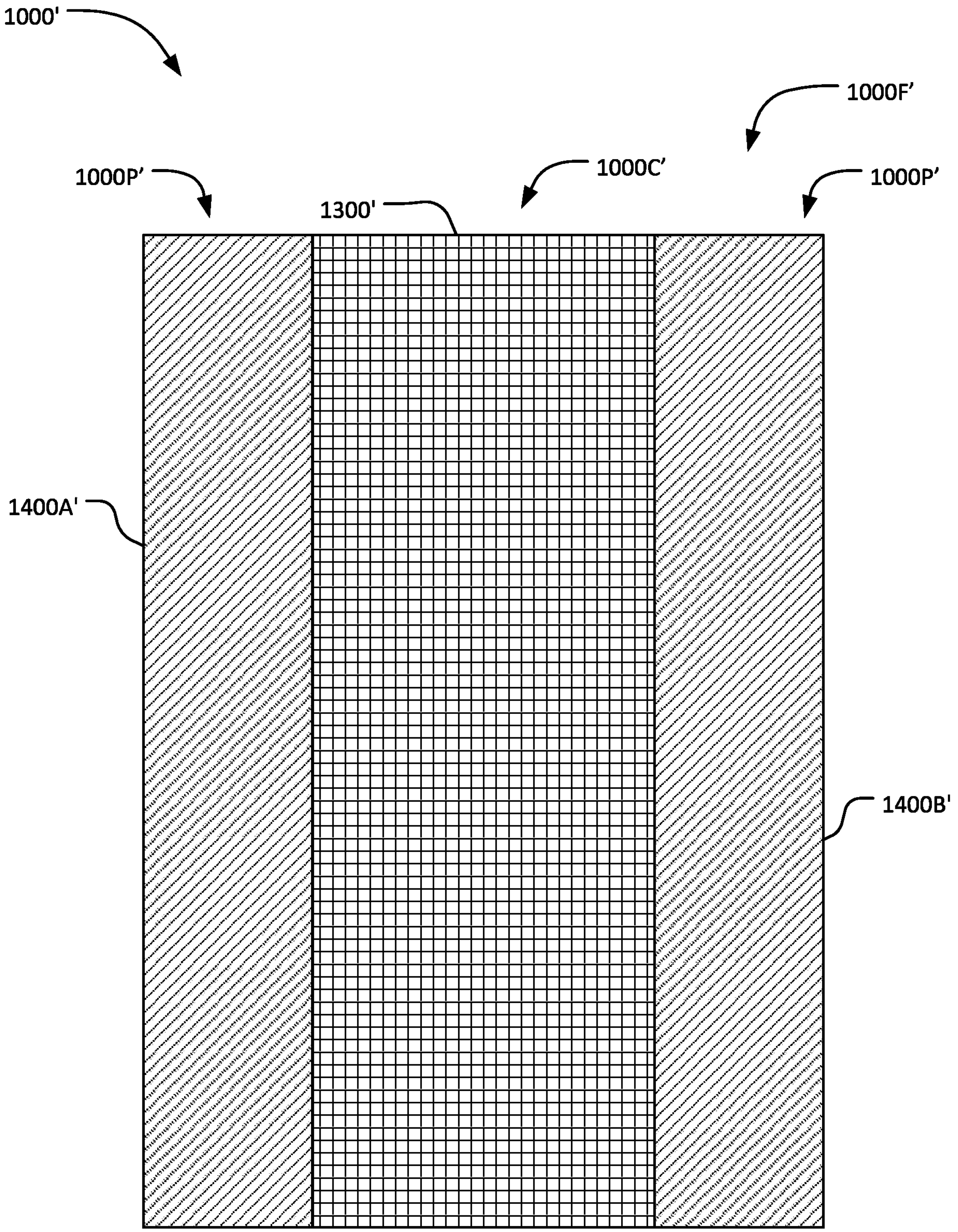
FIG. 15 is a front view of the clear polyester label employing the opaque coating of FIG. 14.
Figure 16:
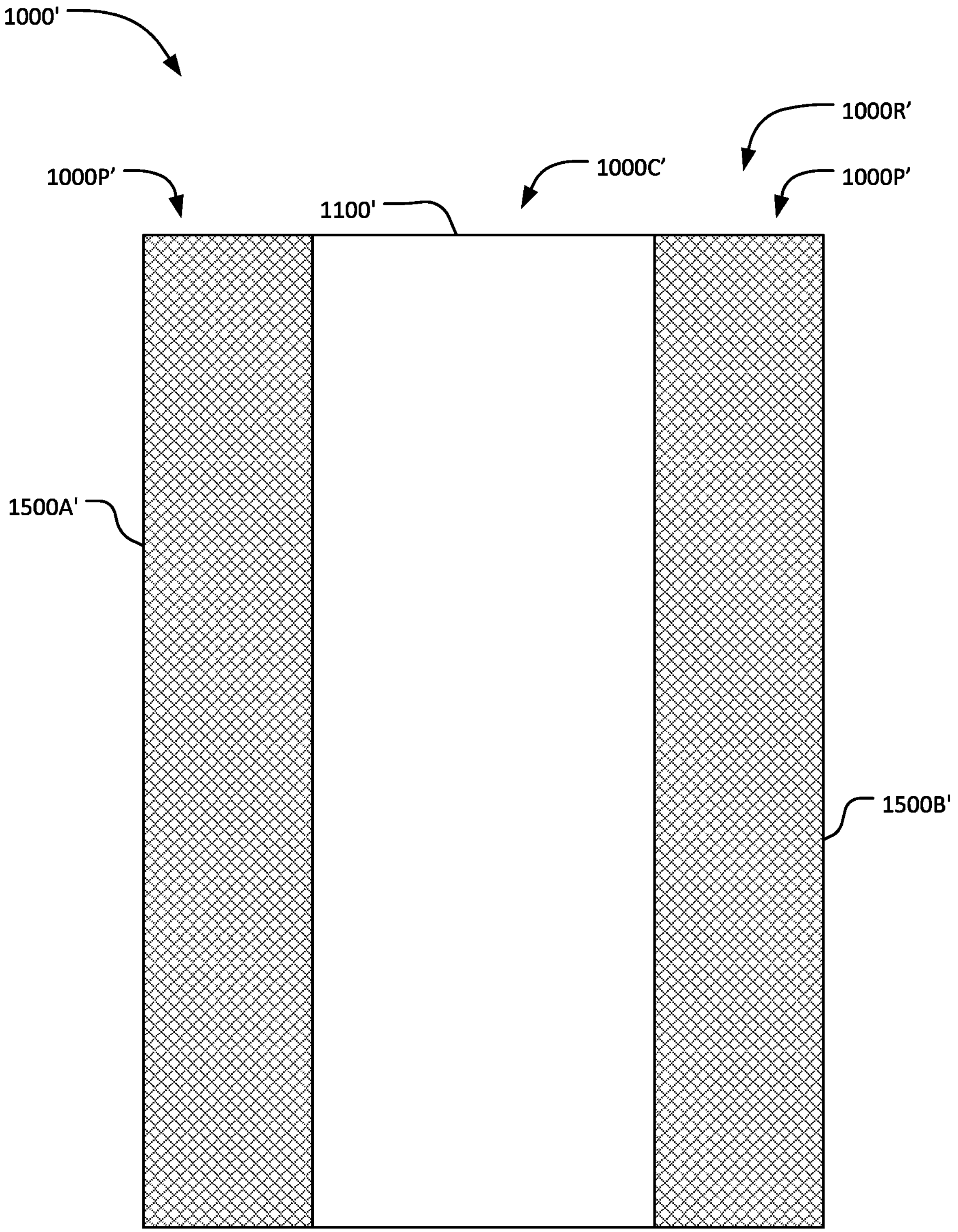
FIG. 16 is a rear view of the clear polyester label employing the opaque coating of FIG. 14.

FIGS. 14-16 depict an example clear polyester embodiment 1000' which is substantially the same or similar to the clear polyester label 1000, except were expressly noted or would be inherently implied. The clear polyester label 1000' may comprise a clear polyester layer 1100', a colored coating 1200', and a printable coating 1300'. The embodiment 1000' may differ from the embodiment 1000 primarily in that the label 1000' may have patterned release and adhesive layers which may only partially cover the polyester layer 1100'. The printable coating 1300' may therefore be exposed for direct printing thereupon. In this manner, printing methods that require direct contact with a substrate may be used with embodiment 1000', whereas such methods would otherwise be limited by the release layer 1400 of the label 1000. Inkjet printing and laser printing are a few examples of printing types which require direct access to the surface which is being printed upon, and which may be usable with the polyester label 1000', though the coating 1300' may be limited thereto (e.g., the coating 1300' may be configured to receive direct thermal, thermal transfer, dot/line or impact matrix or other printing). In some embodiments, the printable coating 1300' may be foregone and indicia may be printed directly on the UV cured ink layer 1200' instead.

One example adhesive and releasable layer pattern arrangement is shown in FIGS. 14-16. Here, the releasable material may be arranged in releasable strips 1400A' and 1400B', and the adhesive material may be arranged in corresponding adhesive strips 1500A' and 1500B'. The strips 1400A', 1400B', 1500A', and 1500B' may each reside in a border or perimeter portion 1000P', which itself may be outboard of an exposed central portion 1000C'. The central portion 1000C' on both a front side 1000F' of the label 1000' and a rear side of the label 1000' may be devoid of adhesive and/or release material. This may result in a label 1000' whose printable coating 1300' may be directly accessed by a print head, which may be a requirement for certain types of printing (e.g., inkjet, laser printing).

The releasable strips 1400A', 1400B' and the adhesive strips 1500A', 1500B' may be arranged correspondingly to each other such that the releasable strips 1400A', 1400B' of one label 1000' may temporarily affix to the adhesive strips 1500A', 1500B' of an adjacent label 1000' when in a rolled or folded position. Thus, the label 1000' may reduce releasable and adhesive material waste while providing a surface which may readily accept a variety of printing methods (as determined by the type of printable coating 1300' used).

Though the strips 1400A', 1400B', 1500A', 1500B' are depicted herein as longitudinally arranged pairs, such is not the only arrangement contemplated herein. The adhesive and releasable layers of the label 1000' may comprise any suitable pattern, arrangement, and/or number of strips or other forms. Other example arrangements contemplated herein may include: a plurality of adhesive and releasable strips arranged laterally along the label 1000', a plurality of adhesive and releasable strips arranged diagonally along the label 100', one or more regions of the label 1000' having peaks and valleys of adhesive and releasable material, et cetera.

Like the embodiment 1000, the label 1000' may have any suitable number and arrangement of label 1000' layers on the front surface 1000F' and the rear surface 1000R' thereof. For instance, a layer of printable coating 1300' may be provided in the central regions 1000C' of both surfaces 1000F' and 1000R' such that the label 1000' may readily accept printing on both sides (i.e., duplex printing).

While the label 1000' shown in FIGS. 14-16 has releasable strips 1400A', 1400B' and adhesive strips 1500A', 1500B' located on opposing sides of the label 1000', this need not be the case in every embodiment. In some embodiments, the strips 1400A', 1400B', 1500A', and 1500B' may all be arranged on the same side of the label 1000'. Here, the releasable strips 1400A', 1400B' may be temporarily secured to the adhesive strips 1500A', 1500B' of the same label 1000' (as opposed to an adjacent label 1000'). These embodiments may advantageously be used with printers which are not configured for lineless printing, for example.

In some embodiments, the label 1000' may have perforations, die cuts, or other types of lines of weakness which may delineate the perimeter region 1000P' from the central region 1000C'. A user may exploit these lines of weakness to dissociate portions of the label 1000'. For instance, a user may exploit lines of weakness to separate the central region 1000C' from the perimeter region 1000P', which itself may still be adhered to a substrate.

Figure 17:
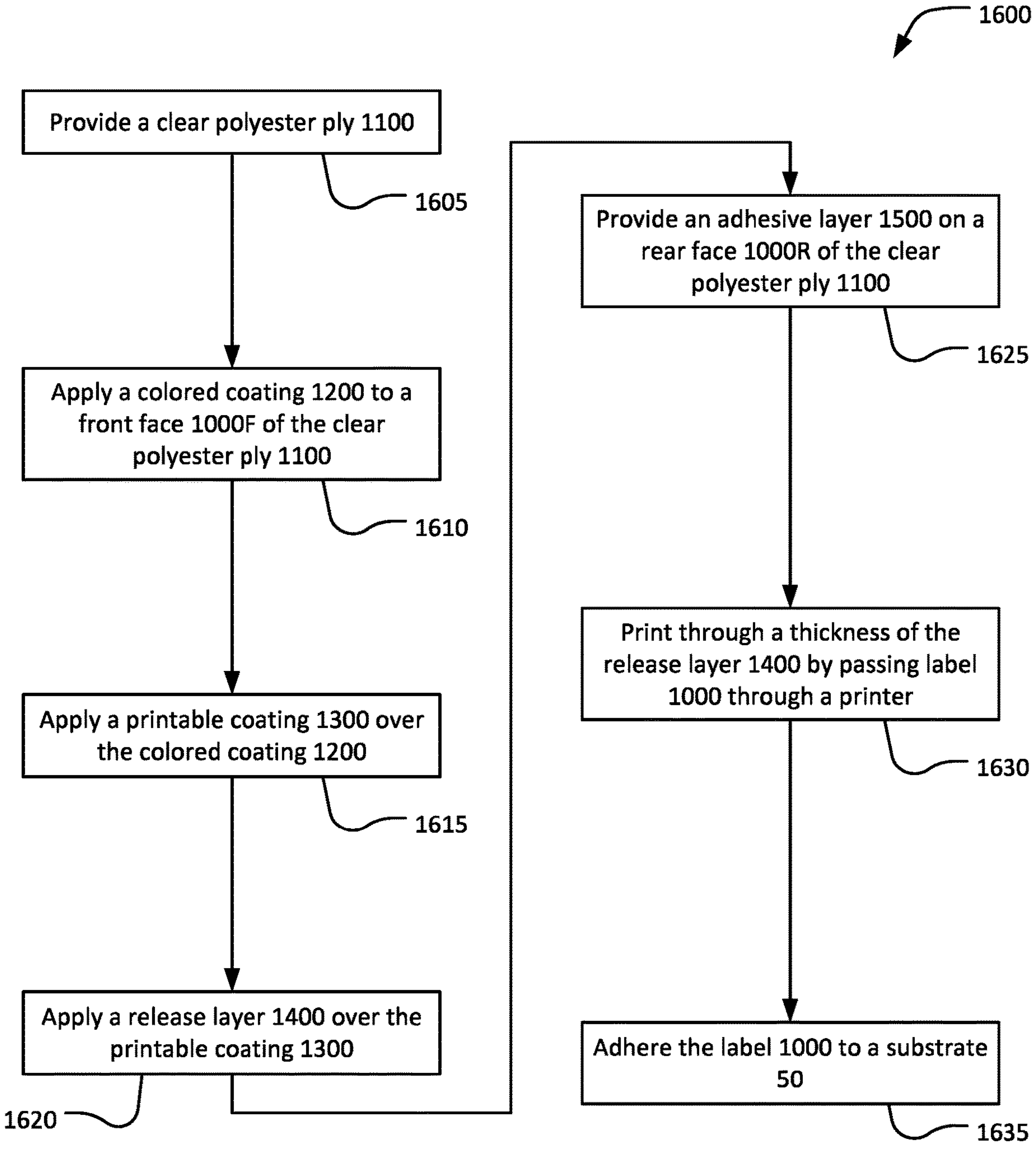
FIG. 17 is a flow chart illustrating a method of using the clear polyester label employing the opaque coating of FIG. 11.

FIG. 17 is a flow chart illustrating a method 1600 of making and using the label 1000, in an embodiment. The method 1600 may be used to form a label which, for example, emulates or replicates a paper label. The label 1000 may emulate the appearance of a paper label with the use of the colored coating 1200. The label 1000 may, however, be devoid of paper plies and thus may avoid some of the downsides associated therewith. The label 1000 may provide for a versatile label that benefits from the more rigid, durable construction of a polyester ply without suffering from the downsides (e.g., cost, thickness) normally associated with such colored polyester plies.

First, at step 1605, the clear polyester ply 1100 may be provided. As discussed above, the polyester ply 1100 may have a clear or non-opaque (i.e., transparent, translucent) appearance, and have a thickness under about 3 mils. This polyester ply 1100 may, for example, be made inherently clear by forgoing a coloring agent during manufacture. Next, at step 1610, the colored coating 1200 may be applied to a surface of the polyester ply 1100 (e.g., on a front side 1000F thereof). The colored coating 1200 may be, for instance, a UV curable ink of a desired color. The colored coating 1200 may, in some embodiments, have a white color so as to provide the polyester ply 1100 with a paper-like appearance.

At step 1615, the printable coating 1300 may be applied over the colored coating 1200. In embodiments, the entirety of the label front side 1000F may be made printable via the printable coating 1300. In alternate embodiments, only a portion of the label 1000 may be made printable, such as by only providing the printable coating 1300 in select areas of the label 1000. The printable coating 1300 may be configured to receive any suitable type of printing, such as direct thermal printing. At step 1620, the release layer 1400 (e.g., a silicone layer) may be placed over the printable coating 1300. In embodiments, the release layer 1400 may cover an entirety of the label front face 1000F. At step 1625, the adhesive layer 1500 may be applied to the polyester ply 1100. In embodiments, the adhesive layer 1500 may be located on a side of the polyester ply 1100 opposing the release layer 1400. In still more embodiments, a size, shape, and/or pattern of the adhesive layer 1500 may correspond to that of the release layer 1400. In this manner, labels 1000 that are upwardly adjacent to each other may be precluded from permanently affixing to each other (e.g., the release layer 1400 of a first label 1000 may only temporarily adhere to the adhesive layer 1500 of a second label 1000 instead).

After the label 1000 is assembled, the label 1000 may receive printed matter by being passed through a printer, at step 1630. The printer may print indicia (e.g., text, images, colors, barcodes, etc.) on the label 1000 (i.e., on the printable coating 1300 thereof). The printable coating 1300 may, in embodiments, indirectly receive the printed matter. For example, heat from a print head of the printer may be transferred through a thickness of the release layer 1400 to provide indicia on a direct thermal printable coating 1300. Next, at step 1635, the label 1000 may be affixed to a (e.g., substrate 50, FIGS. 9A-9E) via the adhesive layer 1500. In embodiments, this step may be accomplished manually, such as with the hand of a user.

It is understood that the steps of the method 1600 may be modified, added to, and/or omitted as desired. For example, the method 1600 may be modified by adding the step of providing lines of weakness (i.e., die cuts, perforations) in the label 1000 (which may eventually be exploited by the user). As another example, the method 1600 may include the steps of creating a plurality of labels 1000 and temporarily adhering the plurality of labels 1000 together in a roll. As still another example, the method 1600 may be modified to include the steps of applying a printable coating 1300 on the label back side 1000R and providing printed matter thereupon. In embodiments where multiple printable coatings 1300 are provided on the label 1000 (e.g., on opposing sides thereof), the method 1600 may include the steps of printing on each of those printable coatings (e.g., with simultaneous duplex printing, with multiple passes through a printer, et cetera).

In embodiments, the method 1600 may be readily modified to make and use the label 1000' instead. For instance, the method 1600 may be modified so that the release layer 1400' and the adhesive layer 1500' are selectively applied to the polyester ply 1100' in portions, strips, or patterns (i.e., release strips 1400A', 1400B' and corresponding adhesive strips 1500A', 1500B') such that a region 1000C' of the label 1000' is available for direct printing. In such embodiments, the method 1600 may be further modified to print indicia on the label 1000' in the areas around the release layer 1400', as opposed to through the release layer 1400'. As discussed above, such an arrangement may allow for the use of a printable coating 1300' that is configured to directly receive printed matter from a print head (e.g., via inkjet printing, laser printing, dot/line matrix printing, et cetera).

Figure 18:
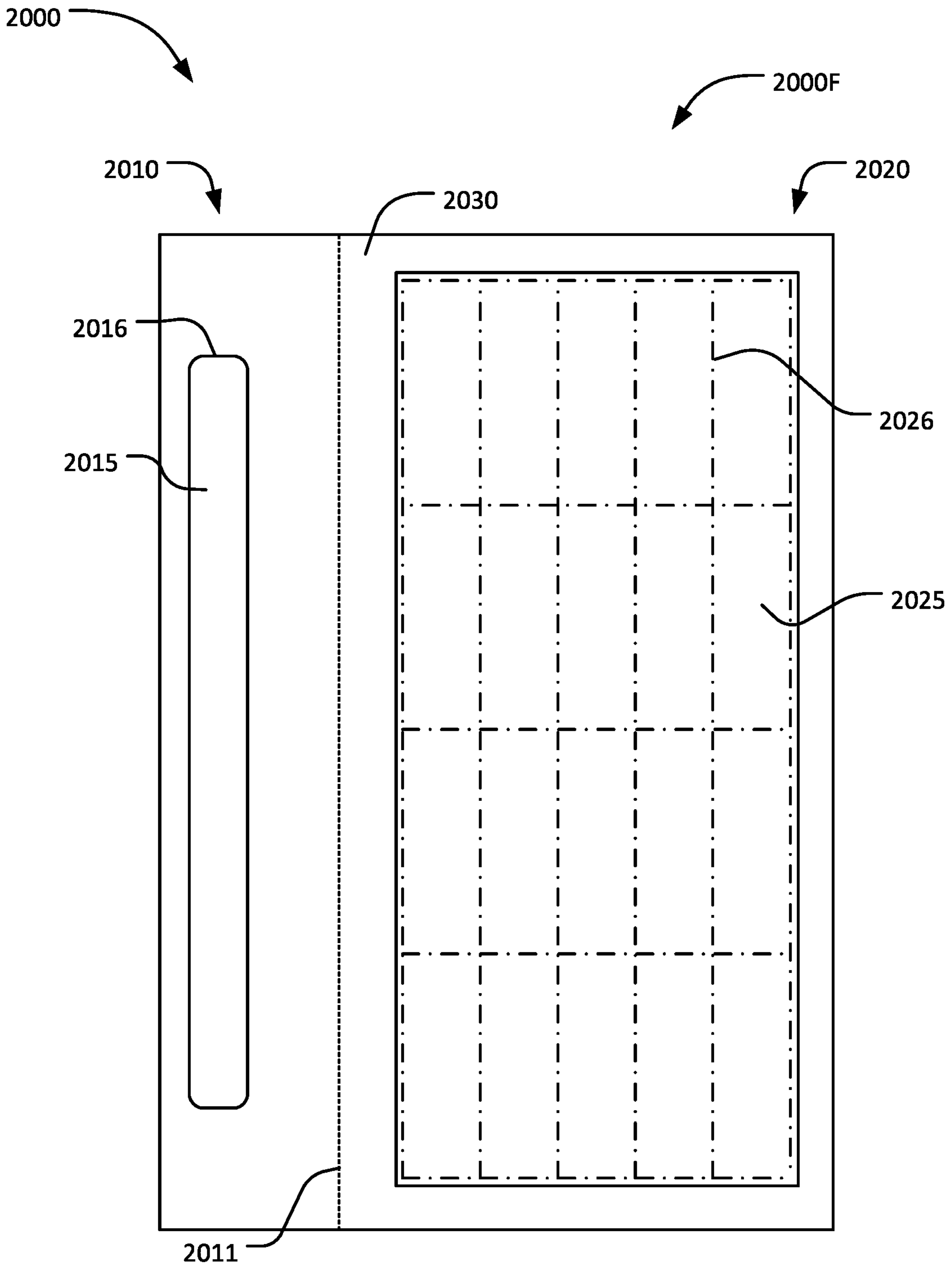
FIG. 18 shows a front view of a business form employing a polyester backing, according to an embodiment of the disclosure.
Figure 19:
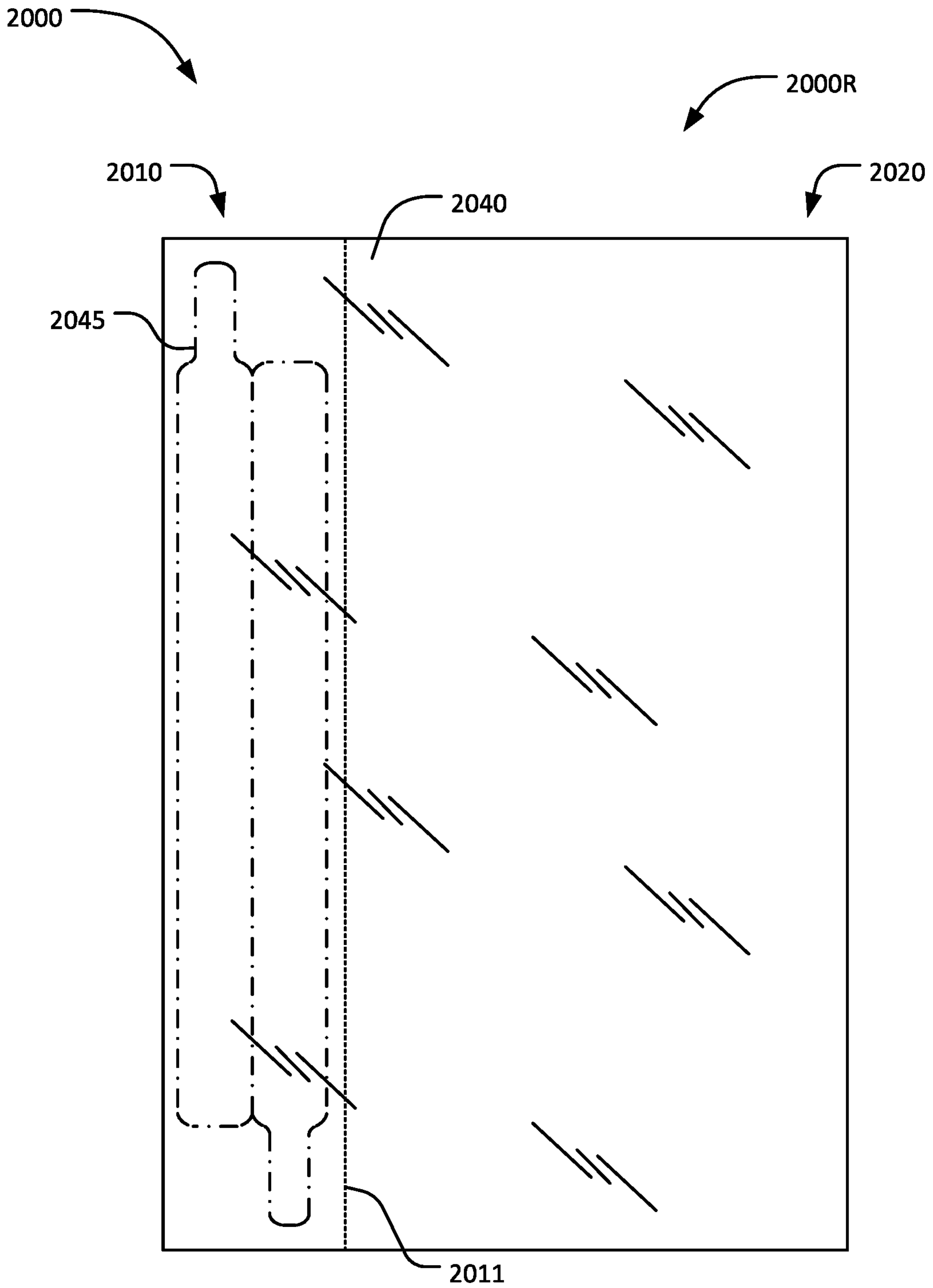
FIG. 19 shows a rear view of the business form employing the polyester backing of FIG. 18.
Figure 20:
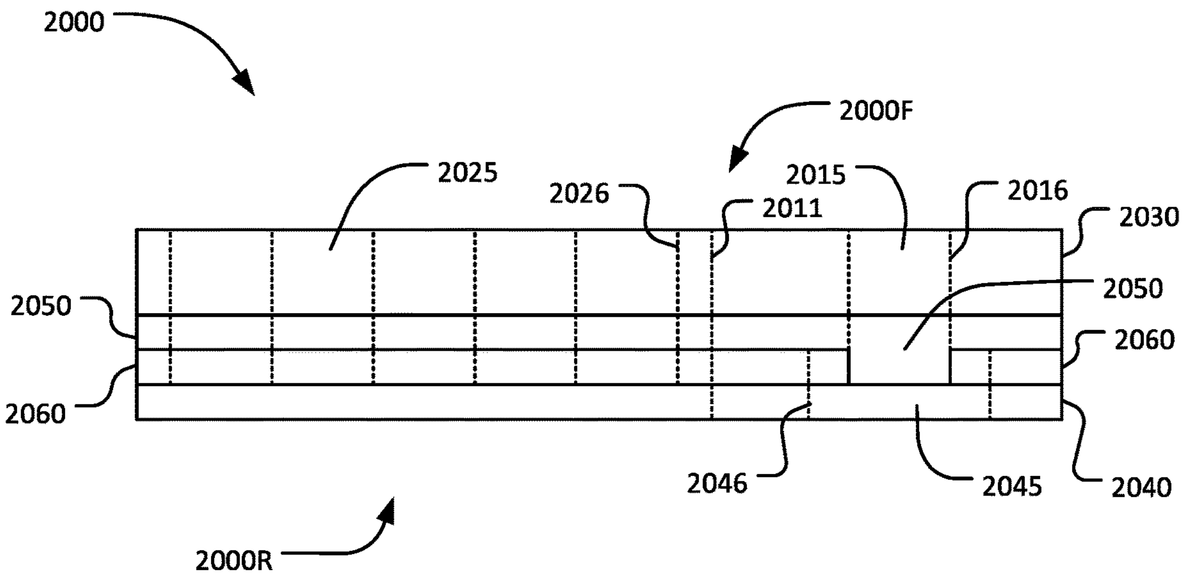
FIG. 20 shows a schematic view of layers of the business form employing the polyester backing of FIG. 18.

Focusing now on FIGS. 18-20, an embodiment 2000 of a business form having a relatively thinner polyester layer 2040 (FIG. 19) is shown. The business form 2000 may be a combination form comprising two or more sections, such as a wristband section 2010 and a label section 2020 separated by one or more lines of weakness 2011 (e.g., die cuts, perforations, et cetera). That is to say, the lines of weakness 2011 may define the portions 2010 and 2020. The business form 2000 may further comprise both a front side 2000F and a rear side 2000B (FIG. 20), as well as a paper ply 2030, the polyester layer 2040, an adhesive layer 2050, and a silicone release layer 2060. Information or other indicia (e.g., images, text, colors, barcodes, etc.) relevant to a business form application may be printed (e.g., via direct thermal printing, thermal transfer, inkjet, laser, or other suitable printing methods) within the wristband section 2010 (e.g., on a wristband 2015) and/or the label section 2020 (e.g., on one or more labels 2025). Labels 2025 found within the label region 2020 may be removable from the business form 2000, and once removed, may be adherable to another surface or substrate (e.g., a package). The business form 2000 may be relatively thinner than conventional business forms through the use of a relatively thin polyester layer 2040, which may be manufactured using the roller 200 (FIG. 4), as discussed previously.

The business form 2000 may comprise printed indicia. The printed indicia may be preprinted (e.g., by the manufacturer) and may comprise instructions for using the business form 2000 or other static or variable indicia. Alternately or additionally, in embodiments, the business form 2000 may comprise printed matter which is selectively applied thereto by a user, such as shipping information, package list information, invoice information, patient information, et cetera. The business form 2000 may use any suitable form of printing now known or subsequently developed. In embodiments, the paper ply 2030 may further comprise a printable coating configured to receive a suitable type of printing.

The wristband section 2010 and the label section 2020 may be formed from a single paper ply. That is to say, the wristband section 2010 paper ply may be coplanar or coexistent with the label section 2020 paper ply. The paper ply 2030 may be configured to receive printed matter, such as through the use of printable coatings or by being inherently printable, for example. Embodiments of the business form 2000 may alternately or additionally have printed matter on the back side 2000R of the form 2000. Furthermore, one or more polyester plies may be substituted for the paper ply 2030 where desired, as described herein.

The one or more labels 2025 may be defined by lines of weakness 2026 (e.g., perforations, die cuts, etc.) in the paper ply 2030. The lines of weakness 2026 may be broken or otherwise exploited to remove the labels 2025 (and the other layers 2020, 2040 associated therewith) (FIG. 20) from the business form 2000. The labels 2025 may be releasably secured to the polyester ply 2040 by an adhesive layer 2050. The one or more labels 2025 may be configured to receive printed matter (e.g., at the same or a different time than when the wristband section 2010 receives printed matter). Similarly, the wristband section 2010 may have a wristband 2015 defined therein by lines of weakness 2016. The wristband section 2015 may be likewise configured to receive indicia.

FIG. 19 depicts a rear side 2000R of the business form 2000, showcasing the polyester wristband 2045 that is formed within the polyester layer 2040. The polyester wristband 2045 may be defined by die cuts 2046 made therein, and may be located proximate (e.g., adjacent) the wristband section 2015 formed in the paper layer 2030. The wristband section 2015 and wristband 2045 may be fixedly joined together by the adhesive layer 2050 such that, when the lines of weakness 2016 and die cuts 2046 are exploited, the wristbands 2015 and 2045 disassociate from the form 2000 together. Put another way, the wristband section 2015 and wristband 2045, along with the intervening adhesive layer 2050, may be collectively separable from the business form 2000.

Focusing now on FIG. 20, a schematic side view is shown of the business form 100. The artisan would understand that the layers shown are not to scale, and are instead sized to provide clarity as to the makeup of the business form 2000. While layers are shown located extending the entirety of business form 2000, in embodiments, this may not be the case. Rather, one or more portions of the business form 2000 may be devoid of one or more layers. For example, the paper ply 2030 that resides within the wristband section 2015 may be devoid of silicone release layer 2060, such that the wristband section 2015 portion of the paper ply 2030 directly contacts and fixedly secures to the adhesive layer 2050, and thus the polyester layer 2040.

Starting from the front side 2000F and moving towards the rear side 2000R of the business form 100, the paper ply 2030 is first encountered. As mentioned above, the paper ply 2030 may be a singular paper ply, or they may be a plurality of paper plies (e.g., stacked in an overlapping manner, side-by-side, et cetera). The adhesive layer 2050 applied to the rear face 2000R of the paper ply 2030 (e.g., the entirety thereof) may next be encountered. The adhesive used in the layer 2050 may be any suitable adhesive now known or subsequently developed. In embodiments, the adhesive layer 2050 may be specifically chosen to be compatible with the type of printing that will be used on the business form 2000, such as laser printing. The adhesive layer 2050 may be configured such that a portion of the adhesive layer 2050 comes away with the one or more labels 2025 when those labels 2025 are removed from the rest of the label section 2020. In this manner, the labels 2025 may be readherable to a surface once removed from the form 2000. In embodiments, the adhesive layer 2050 may be optimally arranged on the business form 2000 and/or in a pattern (e.g., a diamond pattern).

Moving down from the adhesive layer 2050, the silicone release layer 2060 may be encountered, followed by the polyester layer 2040. The silicone layer 2060 may have releasable properties such that the silicone layer 2060 may be readily peelable or otherwise removable from an adhesive. Meanwhile, the polyester layer 2040 may provide structural strength to the silicone layer 2060 and the paper ply 2030 while attached thereto. These two layers 2060 and 2030 may cover the adhesive layer 2050 such that the adhesive layer 2050 does not unduly adhere to debris or an unwanted surface. The polyester ply 2040 may be formed using a roller machine 200 (FIG. 4). The artisan would understand that, in some embodiments, the lines of weakness 2011 may extend through one or more of these layers 2030, 2040, 2050, and 2060. Similarly, the lines of weakness 2026 may extend through the layers 2030 and 2050 to facilitate the removal of the labels 2025 and the portions of the layers 2030 and 2050 associated therewith. However, the lines of weakness 2016 defining the wristband 2015 in the paper ply 2030 may extend only through the layers 2030 and 2050.

The polyester ply 2040 may be relatively thinner (e.g., by having a thickness in the range of 0.4 mil to 1.8 mil) than prior art release liners, which are more than 1.8 mil thick. In embodiments, the polyester ply 2040 may be about 0.4 mil, 0.5 mil, 0.6 mil, 0.7 mil, 0.8 mil, 0.9 mil, or 1.0 mil thick. In other embodiments, the polyester ply 2040 may be about 1.1 mil, 1.2 mil, 1.3 mil, 1.4 mil, 1.5 mil, 1.6 mil, 1.7 mil, 1.8 mil, 1.9 mil, or 2.0 mil thick. In currently preferred embodiments, the polyester ply 2040 has a thickness of one of 0.48 mil, 0.92 mil, 1.2 mil, and 1.42 mil. In the prior art, for label applications such as the applications disclosed herein, a polyester/silicone liner typically has a thickness of 2 mil or more.

This polyester ply 2040 (e.g., a polyester layer having an average thickness of 0.48 mil, 0.92 mil, 1.2 mil, or 1.42 mil, for example) may be configured for use with the rest of the form 2000, as described above. The skiving apparatus may comprise a roller machine 200 (FIG. 4), which uses a slotted roller 210 to skive, knurl, or otherwise scrap a selective amount of silicone or polyester material off of the polyester layer 2040. The remaining material of the polyester layer 2040 may have a variable thickness that is not constant along the polyester layer 2040 (e.g., the polyester layer 2040 may have peaks and valleys or areas that have a reduced thicknesses relative to other areas, hereinafter "pattern"). Selectively removing some of the polyester layer 2040 and/or creating a pattern therein may modify the release properties of the polyester ply 2040 beyond that of merely applying less silicone to a liner layer while also creating a relatively thinner layer. For example, the silicone layer 2060 may still releasably couple the adhesive layer 2050 to the polyester layer 2040, but the strength of that coupling (or the "tightness," as people in the industry may call it) may change. In embodiments, the use of the slotted roller 210 may increase the grip of the adhesive layer 2050 on the polyester ply 2040, requiring more force to separate the layers 2050 and 2040. Put in other words, not only may this process desirably decrease the average thickness of the polyester ply 2040, but it may also desirably increase how tightly the adhesive layer 2050 affixes to the layer 2040. A stock polyester layer 2040 having silicone 2060 and an average thickness of under 1.8 mil may not operate as intended in business form applications.

In embodiments, the roller machine 200 may alternatively or additionally perform skiving on any other layer of the form 2000 besides the polyester layer 2040 and/or the silicone layer 2060. For instance, skiving may be performed on the paper ply 2030. Such embodiments of the form 2000 may have one or more layers which are relatively thinner than a corresponding layer of a conventional business form due to this skiving operation. In still more embodiments, the business form 2000 may be relatively thinner (e.g., by having a form 2000 layer that is relatively thinner than a corresponding conventional layer) without the use of the roller machine 200 skiving operation. This thinness may be achieved, for example, by manufacturing a polyester layer 2040, or other layer, with peaks and valleys or another similar pattern. This may differ from the previously described skiving operation, where a pre-manufactured release liner (or other layer) may be modified by reducing a thickness thereof via the skiving operation.

The business forms 2000 and 2000' may have one or more other coatings or layers applied thereto or associated therewith (e.g., associated with one or more of the polyester layers 2040, 2040A', and/or 2040B'). For example, the business form 2000 may have, in embodiments, a coating which provides resistance to static charge build up in the form 2000. One such example static-resistant coating may be Staticide, produced by ACL Inc., of Chicago, Illinois. As another example, the business form 2000 may alternately or additionally have a coating which increases the water resistance of the business form 2000. In embodiments, the business form 2000 may alternately or additionally use other anti-static methods, such as an anti-static rope or bar.

Figure 21:
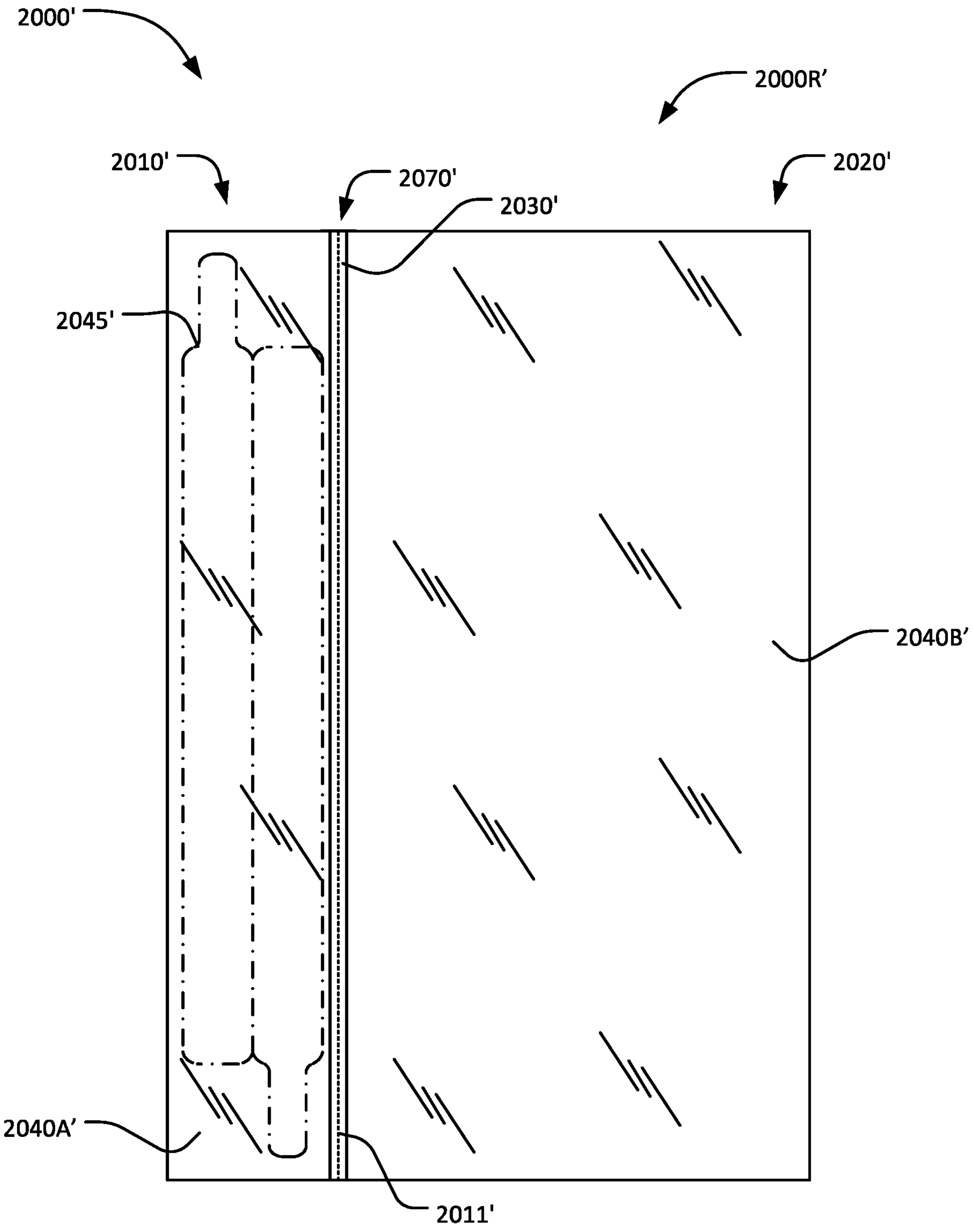
FIG. 21 shows a rear view of a business form employing a plurality of polyester backings, according to another embodiment of the disclosure.

FIG. 21 depicts a rear view of an embodiment 2000' of a business form having wristband and label components, which is substantially the same or similar to the business form 2000, except where expressly described or would be inherently implied. Corresponding reference numbers have been used to denote corresponding parts, though with any noted deviations. A primary difference between the form 2000 and the form 2000' may be that the form 2000' shown in FIG. 21 comprises a plurality of polyester backing plies 2040A' and 2040B' instead of a solitary polyester layer. The polyester layer 2040A' may generally correspond to the wristband section 2010' and the polyester layer 2040B' may generally correspond to the label section 2020'. The polyester layers 2040A' and 2040B' may be separated or spaced apart by an intermediate region or gap 2070' that is devoid of polyester (i.e., the polyester layers 2040A' and 2040B' may be spaced apart from each other). The line of weakness 2011' may reside and/or extend entirely within this gap 2070'. From the rear side 2000R' the paper layer 2030' may be exposed (i.e., in embodiments where no adhesive or silicone is located in the intermediate region 2070'). The polyester layers 2040A' and 2040B' may have the same characteristics (e.g., the same thickness). Alternately, in embodiments, the polyester layers 2040A' and 2040B' may have differing characteristics (e.g., the polyester layer 2040A' may have a disparate thickness from a thickness of the polyester layer 2040B').

Figure 22:
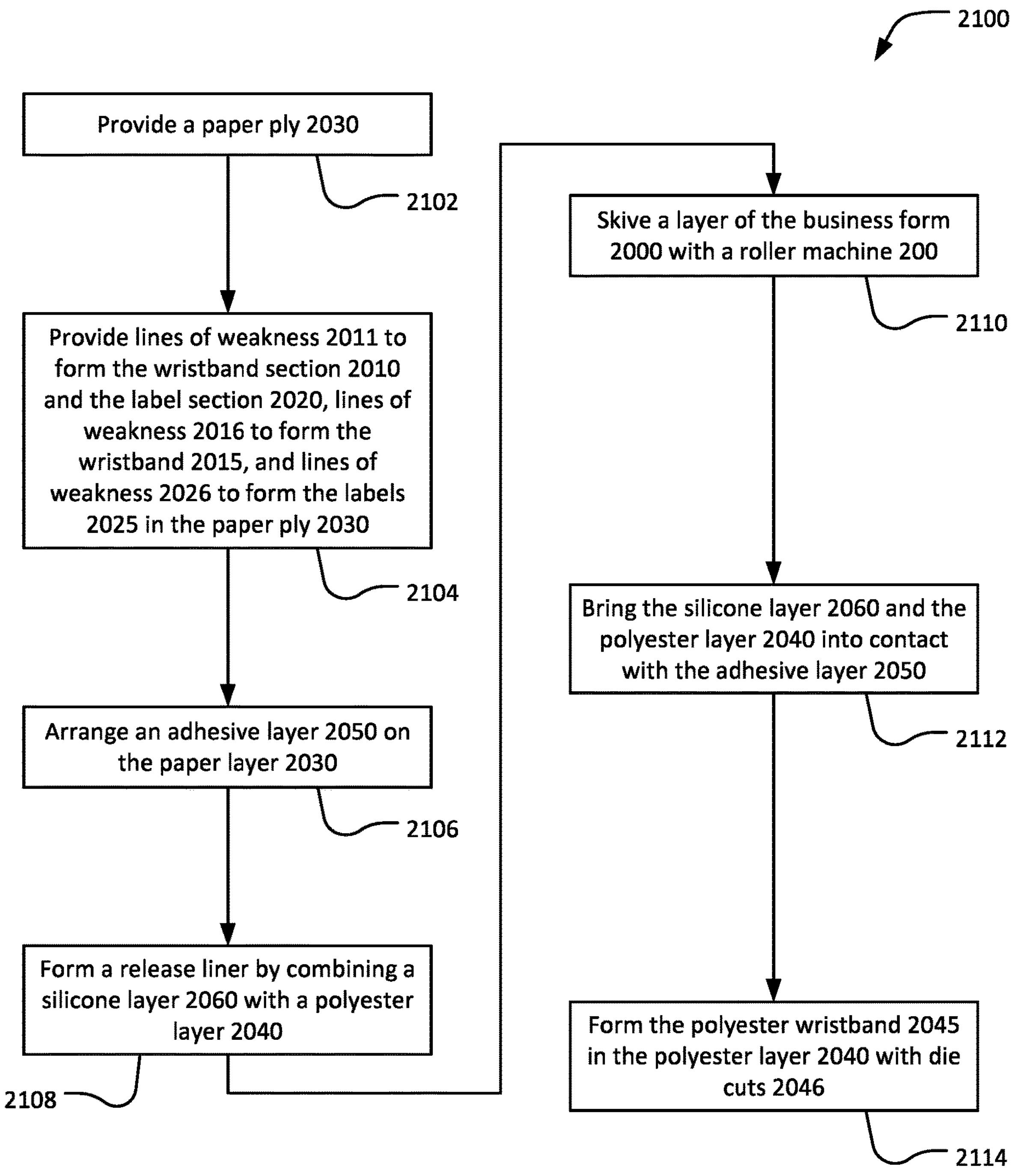
FIG. 22 is a flow chart illustrating a method of forming the business form employing the polyester backing of FIG. 18.

FIG. 22 is a flowchart illustrating a method 2100 of forming the various embodiments of the business form disclosed herein. First, at step 2102, the paper ply 2030 may be formed into a sheet. Then, at step 2104, lines of weakness 2011 may be formed here to distinguish sections 2010 and 2020. Furthermore, lines of weakness 2016 and 2026 may be formed in the paper ply 2030 to define the wristband 2015 and the labels 2025, respectively. Next, at step 2106, the adhesive layer 2050 may be optimally arranged along the rear face of the paper ply 2030.

Next, at step 2108, a release liner may be formed by joining the silicone layer 2060 and the polyester layer 2040. This release liner may then undergo a skiving process (e.g., with the roller machine 200), at step 2110, to reduce a thickness of the layer 2030 and/or 2060. Specifically, the layers 2030 and/or 2060 may be skived, pressed, scraped, or knurled by the slotted roller 210 to effectively decrease the thickness of the layers 2030 and/or 2060 and impart a pattern thereon. Performing a skiving operation on the one or more layers 2030 and/or 2060 may improve the overall release properties thereof. At step 2112, the silicone ply 2060 and the polyester ply 2040 may be brought in contact with the adhesive layer 2050 of the business form 2000 to temporarily affix thereto. Finally, at step 2114, the polyester wristband 2045 may be formed in the polyester layer 2040 by forming die cuts 2046 therein.

The steps of the method 2100 may be omitted, added to, or modified to implement the various embodiments of the business form described herein. For example, the step of printing indicia or other printed matter (e.g., with laser printing) on the business form 2000 may be added to the method 2100. As another example, the step of removing one or more of the labels 2025 and applying the labels 2025 to another surface may be added to the method 2100. As yet another example, to form the business form 2000' instead, two separate polyester plies 2040A' and 2040B' may be arranged on the form 2000' with an intervening gap 2070' (i.e., a portion devoid of polyester material) therebetween.

By processing the business form layers with the machine 200 and the roller 210, a relatively thinner business form 2000 and/or 2000' that does not suffer from the same issues as conventional thin business forms may be created. The increased tightness of the silicone layer 2060 and/or the polyester layer 2040 may prevent those layers from prematurely disassociating from the paper ply 2030, such as when a static build up occurs during travel of the business form 2000 and/or 2000' through a printer. A business form using a polyester liner may benefit from the fact that polyester is nonporous (i.e., more water resistant than paper) and has better tensile strength than a paper liner.

Furthermore, depending on the application, and the thickness of the business form 2000 layers, a user may add or decrease the moisture in the form. Moisture may be added to the business form 2000 through steam, a humidifier, et cetera. Moisture may be removed from the business form 2000 by applying heat thereto.

The artisan would understand that while a single wristband 2015 and 2045, and a single label section 2020 are shown in the figures, other arrangements are contemplated herein. Furthermore, any suitable number and arrangement of labels (and their associated adhesive, silicone, and polyester liner layers) are contemplated and within the scope of the disclosure.

The artisan would understand that the label and business forms embodiments discussed herein may be readily adapted in form or arrangement to suit a given label/business form application. Each of these business forms may comprise a polyester liner (e.g., polyester liner 130, 1100, 1100', 2040, 2040A', and/or 2040B') of relative thinness (e.g., having an average thickness of 1.8-2.0 mils or less). In some embodiments, the business forms may, alternatively or additionally, comprise a polyester face ply and/or intermediate ply. Some embodiments of the present disclosure may have what is referred to herein as an "integrated label/uniweb." These integrated label/uniweb options may comprise a plurality of layers, some or all of which may be made of the polyester material described above (e.g., the label may have a front polyester layer and/or a back polyester layer having less than 2.0 mil thickness). One or more labels of these integrated label/uniweb embodiments may be incorporated within the front layer and/or the back layer. While the labels may have the same material as the layer(s) in which they reside, this need not be the case in some embodiments. That is to say, the labels may be made of the polyester material described herein while the surrounding layer(s) do not, and vice versa. The polyester plies disclosed herein may readily be used with rolled media, sheets (e.g., laser printable sheets), and/or fan-folded media.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and sub-combinations are of utility and may be employed without reference to other features and sub-combinations. Not all steps listed in the figures need be carried out in the exact order described.

What is claimed is:

1. A combination wristband and label form, comprising:

a front side comprising a paper ply, said paper ply having a label section and a wristband section separated from said label section by a line of weakness, said label section comprising a plurality of printable labels die cut therein, said wristband section comprising a first wristband portion die cut therein; and a back side comprising a first polyester ply and a second modified polyester ply spaced apart from said first polyester ply by a gap, said first polyester ply opposing at least part of said wristband section, said second modified polyester ply configured as a liner and opposing at least part of said label section, a first layer of adhesive and a first layer of release material arranged between said paper ply and said first polyester ply, and a second layer of adhesive and a second layer of release material arranged between said paper ply and said second modified polyester ply;

wherein said second modified polyester ply has a variable thickness conferred by a pattern of peaks and valleys in a surface of said second modified polyester ply.

2. The combination wristband and label form of claim 1, wherein an average thickness of said first polyester ply is disparate from an average thickness of said second modified polyester ply.

3. The combination wristband and label form of claim 1, further comprising a static-resistant coating associated with at least one of said first polyester ply and said second modified polyester ply.

4. The combination wristband and label form of claim 1, wherein said line of weakness extends within said gap.

5. The combination wristband and label form of claim 1, wherein said gap is devoid of polyester.

6. The combination wristband and label form of claim 1, wherein said second modified polyester ply has a variable thickness.

7. The combination wristband and label form of claim 6, wherein said second modified polyester ply has an average thickness of less than 2 mil.

8. The combination wristband and label form of claim 1, wherein each of said first polyester ply and said second modified polyester ply have a variable thickness.

9. The combination wristband and label form of claim 8, wherein each of said first polyester ply and said second modified polyester ply have an average thickness of less than 2 mil.

10. A method of forming a combination wristband and label form, said method comprising:

dividing a paper ply into a label section and a wristband section with a line of weakness, said label section comprising a plurality of printable labels die cut therein, said wristband section comprising a first wristband portion die cut therein;

providing a first polyester ply and a second polyester ply;

skiving, using a roller, at least one of said first polyester ply and said second polyester ply to cause said at least one of said first polyester ply and said second polyester ply to have a variable thickness;

disposing a first layer of adhesive and a first layer of release material between said paper ply and said first polyester ply; and disposing a second layer of adhesive and a second layer of release material between said paper ply and said second polyester ply.

11. The method of claim 10, wherein said skiving reduces a thickness of said at least one of said first polyester ply and said second polyester ply.

12. The method of claim 10, further comprising providing a gap in said combination wristband and label form between said first polyester ply and said second polyester ply, said gap being devoid of polyester.

13. The method of claim 10, wherein an average thickness of at least one of said first polyester ply and said second polyester ply is less than 2 mils.

14. The method of claim 10, wherein an average thickness of each of said first polyester ply and said second polyester ply is less than 2 mils.

15. The method of claim 14, wherein said average thickness of each of said first polyester ply and said second polyester ply is one of 0.48 mils, 0.92 mils, 1.2 mils, and 1.42 mils.

16. The method of claim 10, further comprising associating a static-resistant coating with at least one of said first polyester ply and said second polyester ply.

17. A method of forming a combination wristband and label form, said method comprising:

dividing a paper ply into a label section and a wristband section with a line of weakness, said label section comprising a plurality of printable labels die cut therein, said wristband section comprising a first wristband portion die cut therein;

providing a polyester ply;

skiving said polyester ply using a roller to cause said polyester ply to have a variable thickness; and disposing a layer of adhesive and a layer of release material between said polyester ply and each of said label section and said wristband section of said paper ply.

18. The method of claim 17, further comprising associating a static-resistant coating with said polyester ply.

19. The method of claim 17, wherein said polyester ply has an average thickness less than or equal to 2 mils.

20. The method of claim 17, wherein said polyester ply has an average thickness of no more than 1 mil.

* * * * *